United States Patent
Aoyanagi

(10) Patent No.: US 11,294,614 B2
(45) Date of Patent: Apr. 5, 2022

(54) DISPLAY SYSTEM AND CONTROL METHOD

(71) Applicant: Sharp NEC Display Solutions, Ltd., Tokyo (JP)

(72) Inventor: Hisakazu Aoyanagi, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 17/222,918

(22) Filed: Apr. 5, 2021

(65) Prior Publication Data
US 2021/0224016 A1 Jul. 22, 2021

Related U.S. Application Data

(63) Continuation of application No. PCT/JP2018/040841, filed on Nov. 2, 2018.

(51) Int. Cl.
*G06F 3/14* (2006.01)
*G09G 3/36* (2006.01)

(52) U.S. Cl.
CPC ............. *G06F 3/1423* (2013.01); *G09G 3/36* (2013.01); *G09G 2354/00* (2013.01);
(Continued)

(58) Field of Classification Search
CPC ......... G09G 2370/06; G09G 2360/141; G09G 2354/00
See application file for complete search history.

(56) References Cited

U.S. PATENT DOCUMENTS

2009/0265455 A1   10/2009  Hiraki
2011/0035448 A1*  2/2011   Leung .................. G06F 3/1454
                                                    709/205

(Continued)

FOREIGN PATENT DOCUMENTS

JP   2016-085435 A   5/2016
JP   2017-116689 A   6/2017
(Continued)

OTHER PUBLICATIONS

International Search Report (ISR) (PCT Form PCT/ISA/210), in PCT/JP2018/040841, dated Jan. 15, 2019.

*Primary Examiner* — Shaheda A Abdin
(74) *Attorney, Agent, or Firm* — McGinn I.P. Law Group, PLLC.

(57) ABSTRACT

A display system includes a plurality of display devices and portable device configured to operate the plurality of display devices. Each of the plurality of display devices includes an identification information generation unit configured to generate identification information for identifying its own device, and a display control unit configured to cause output information representing the identification information generated by the identification information generation unit to be output from a display unit. The portable device includes an imaging unit configured to capture an image displayed by the display unit of each of the plurality of display devices and a device control unit configured to detect the identification information identifying each of the plurality of display devices on the basis of the output information included in the image captured by the imaging unit and associate the detected identification information with a position of each of the plurality of display devices.

20 Claims, 12 Drawing Sheets

(52) U.S. Cl.
CPC . *G09G 2360/141* (2013.01); *G09G 2360/145* (2013.01); *G09G 2370/042* (2013.01); *G09G 2370/06* (2013.01)

(56) References Cited

U.S. PATENT DOCUMENTS

| | | | |
|---|---|---|---|
| 2013/0271404 A1* | 10/2013 | Choi | H04N 21/42224 345/173 |
| 2018/0049287 A1* | 2/2018 | Lu | H04L 41/08 |

FOREIGN PATENT DOCUMENTS

| | | |
|---|---|---|
| JP | 2018-152663 A | 9/2018 |
| WO | WO 2008/152807 A1 | 12/2008 |
| WO | WO 2013/186835 A1 | 12/2013 |

* cited by examiner

| RECOGNITION NUMBER | DETECTED COORDINATES | SELECTION STATE | ... |
|---|---|---|---|
| XXX1 | (XXX1, XXXX) | NON-SELECTED | ... |
| XXX2 | (XXX2, XXXX) | SELECTED | ... |
| XXX3 | (XXX3, XXXX) | SELECTED | ... |
| ... | ... | ... | ... |

DISPLAY SYSTEM AND CONTROL METHOD

TECHNICAL FIELD

The present invention relates to a display system and a control method.

BACKGROUND ART

In recent years, a display system for displaying a large screen by displaying images side by side on a plurality of display devices has become known (for example, see Patent Literature 1).

CITATION LIST

Patent Literature

[Patent Literature 1]
Japanese Unexamined Patent Application, First Publication No. 2017-116689

SUMMARY OF INVENTION

Technical Problem

In a display system described in Patent Literature 1 described above, each of a plurality of display devices displays an image code representing identification information for identifying the display device on a screen and the display devices are associated with positions of displayed images on the basis of a plurality of image codes. However, in the above-described display system, for example, a complicated operation such as an operation of presetting identification information in each display device is required and the convenience may be impaired.

The present invention has been made to solve the above-described problems and an objective of the present invention is to provide a display system and a control method capable of improving the convenience.

Solution to Problem

According to an aspect of the present invention for solving the above-described problems, there is provided a display system including: a plurality of display devices; and portable device configured to operate the plurality of display devices, wherein each of the plurality of display devices includes an identification information generation unit configured to generate identification information for identifying its own device; and a display control unit configured to cause output information representing the identification information generated by the identification information generation unit to be output from a display unit, and wherein the portable device includes an imaging unit configured to capture an image displayed by the display unit of each of the plurality of display devices; and a device control unit configured to detect the identification information identifying each of the plurality of display devices on the basis of the output information included in the image captured by the imaging unit and associate the detected identification information with a position of each of the plurality of display devices.

Also, according to an aspect of the present invention, there is provided a method of controlling a display system including a plurality of display devices and portable device configured to operate the plurality of display devices, the method including: an identification information generation step in which each of the plurality of display devices generates identification information for identifying its own device; a display control step in which each of the plurality of display devices causes output information representing the identification information generated in the identification information generation step to be output from a display unit; an imaging step in which the portable device captures an image displayed by the display unit of each of the plurality of display devices; and a device control step in which the portable device detects the identification information identifying each of the plurality of display devices on the basis of the output information included in the image captured in the imaging step and associates the detected identification information with a position of each of the plurality of display devices.

Advantageous Effects of Invention

According to the present invention, it is possible to improve the convenience.

DESCRIPTION OF EMBODIMENTS

Hereinafter, a display system and a control method according to embodiments of the present invention will be described with reference to the drawings.

First Embodiment

Figure 1:
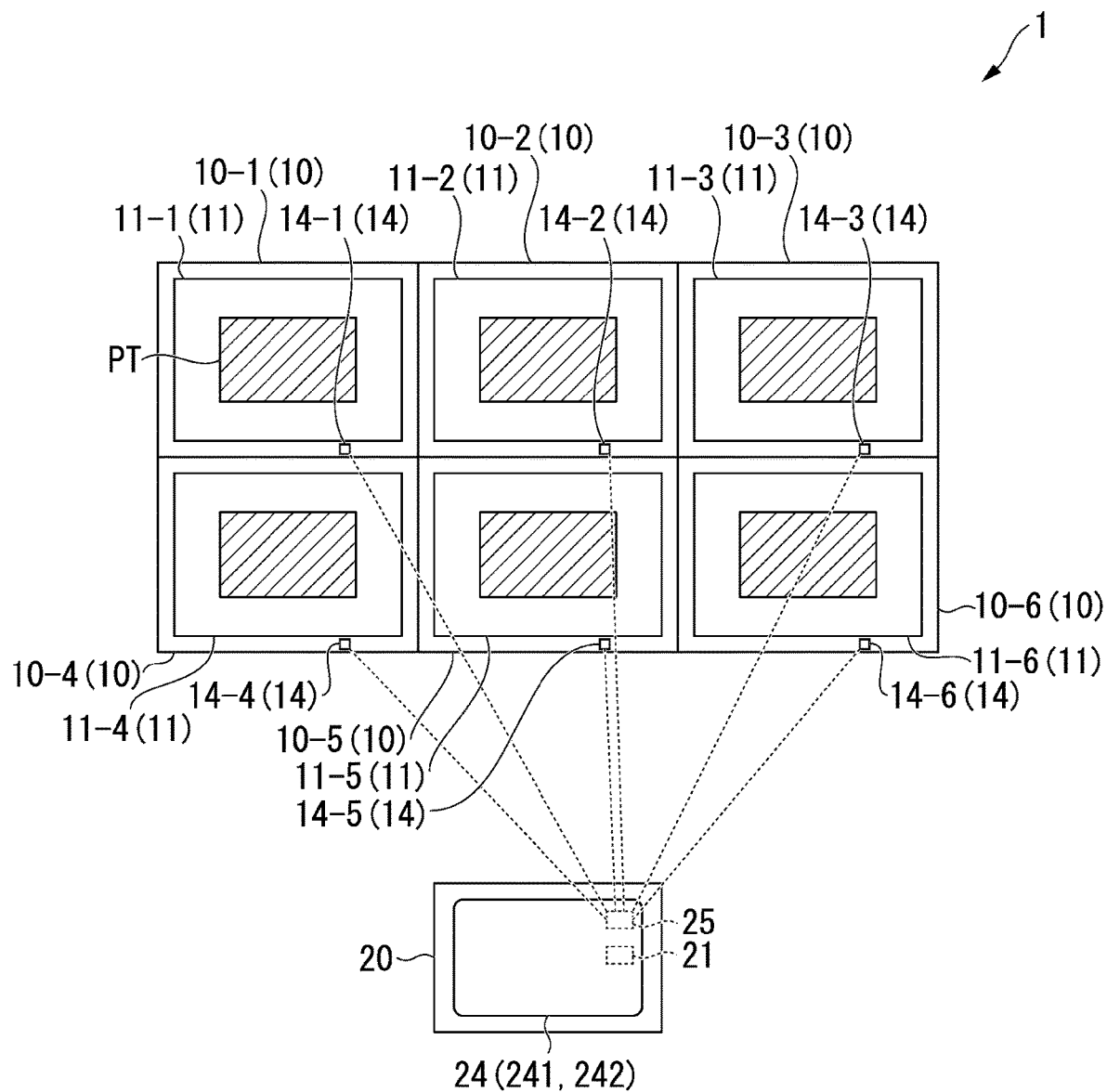
FIG. 1 is an external view showing an example of a display system according to a first embodiment.
Figure 2:
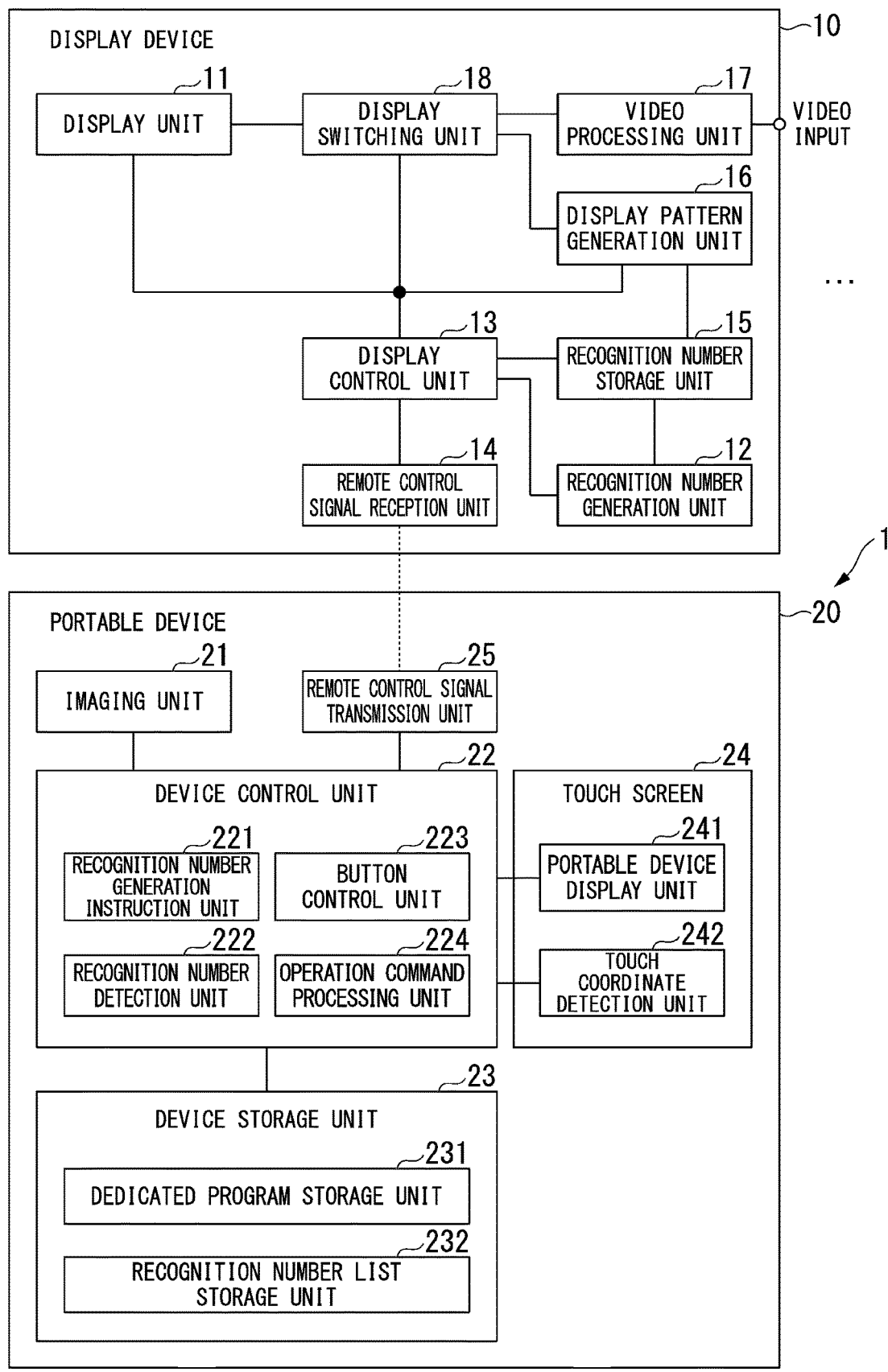
FIG. 2 is a block diagram showing the example of the display system according to the first embodiment.

FIG. 1 is an external view showing an example of a display system 1 according to a first embodiment. Also, FIG. 2 is a block diagram showing an example of the display system 1 according to the first embodiment.

As shown in FIG. 1, the display system 1 includes a plurality of display devices (10-1 to 10-6) and portable device 20. The display system 1 is a system for performing a multi-display process in which a plurality of display devices (10-1 to 10-6) are used when disposed side by side. The display devices (10-1 to 10-6) are operated from the portable device 20.

Also, in the present embodiment, the display device 10-1, the display device 10-2, the display device 10-3, the display device 10-4, the display device 10-5, and the display device 10-6 have the same configuration. When any display device provided in the display system 1 is shown or when the display devices are not particularly distinguished, the display device will be described as the display device 10.

Each of the plurality of display devices 10 displays a recognition number pattern representing a recognition number on a display unit 11. The recognition number is an example of identification information for identifying the display device 10.

Also, as shown in FIG. 1, each of the plurality of display devices 10 includes a display unit 11 and a remote control signal reception unit 14. Also, in FIG. 1, the display unit 11 and the remote control signal reception unit 14 provided in the display device 10-1 are referred to as a display unit 11-1 and a remote control signal reception unit 14-1, respectively, and the display unit 11 and the remote control signal reception unit 14 provided in the display device 10-2 are referred to as a display unit 11-2 and a remote control signal reception unit 14-2, respectively. Also, the display unit 11 and the remote control signal reception unit 14 provided in the display device 10-3 are referred to as a display unit 11-3 and a remote control signal reception unit 14-3, respectively, and the display unit 11 and the remote control signal reception unit 14 provided in the display device 10-4 are referred to as a display unit 11-4 and a remote control signal reception unit 14-4, respectively. Also, the display unit 11 and the remote control signal reception unit 14 provided in the display device 10-5 are referred to as a display unit 11-5 and a remote control signal reception unit 14-5, respectively, and the display unit 11 and the remote control signal reception unit 14 provided in the display device 10-6 are referred to as a display unit 11-6 and a remote control signal reception unit 14-6, respectively.

The portable device 20 is, for example, electronic device such as a smartphone or a tablet terminal, and functions as remote control device for operating the plurality of display devices 10. The portable device 20 includes an imaging unit 21 and a remote control signal transmission unit 25. The portable device 20 captures images including recognition number patterns displayed on the display units 11 of the plurality of display devices 10 in the imaging unit 21 and detects a recognition number of each display device 10 on the basis of the recognition number patterns included in the captured image.

The portable device 20 uses the detected recognition number of each display device 10 to transmit a remote control signal such as an operation command from the remote control signal transmission unit 25 and operate the plurality of display devices 10.

Each display device 10 receives a remote control signal such as an operation command from the remote control signal reception unit 14 and executes various types of processes identifying the operation command when the received remote control signal is an operation command for its own device.

Next, a detailed configuration of the display system 1 according to the present embodiment will be described with reference to FIG. 2. Also, one of the plurality of display devices 10 will be described with reference to FIG. 2 and description of the other display devices 10 will be omitted.

As shown in FIG. 2, the display device 10 includes the display unit 11, a recognition number generation unit 12, a display control unit 13, the remote control signal reception unit 14, a recognition number storage unit 15, a display pattern generation unit 16, a video processing unit 17, and a display switching unit 18.

The recognition number generation unit 12 (an example of an identification information generation unit) generates a recognition number (identification information) for identifying its own device (display device 10) on the basis of control of the display control unit 13. For example, the recognition number generation unit 12 generates the recognition number in accordance with a recognition number generation instruction from the portable device 20. The recognition number generation unit 12 causes the recognition number storage unit 15 to store the generated recognition number.

Also, for example, the recognition number generation unit 12 regenerates the recognition number when a regeneration instruction for its own device (display device 10) has been received from the portable device 20. In this case, the recognition number generation unit 12 regenerates a recognition number other than recognition numbers included in generation exclusion information. Here, the generation exclusion information is a list of recognition numbers identifying the display devices 10 whose recognition numbers are not duplicate among the plurality of display devices 10 and is acquired from the portable device 20. Also, for example, a regeneration instruction includes a recognition number identifying the own device and the recognition number generation unit 12 regenerates the recognition number when the recognition number included in the regeneration instruction is the same as the recognition number stored in the recognition number storage unit 15. The recognition number generation unit 12 causes the recognition number storage unit 15 to store the regenerated recognition number.

The recognition number storage unit 15 (an example of an identification information storage unit) stores the recognition number generated by the recognition number generation unit 12.

The display pattern generation unit 16 (an example of a pattern generation unit) generates a recognition number pattern, which is a display pattern representing the recognition number, on the basis of control of the display control unit 13. For example, the display pattern generation unit 16 generates a bar code which is a one-dimensional code or a QR code (registered trademark) which is a two-dimensional code from the recognition number stored in the recognition number storage unit 15. The display pattern generation unit 16 outputs the generated recognition number pattern to the display switching unit 18.

The video processing unit 17 performs resolution conversion from the resolution of an input video into the resolution of the display device 10, image quality adjustment, and the like with respect to a video based on a video signal (an input video) input from the outside of the display device 10. The video processing unit 17 outputs a video obtained by performing the resolution conversion and the image quality adjustment to the display switching unit 18.

On the basis of the control of the display control unit 13, the display switching unit 18 switches between the recognition number pattern output by the display pattern generation unit 16 and the video output by the video processing unit 17 and outputs the recognition number pattern or the video to the display unit 11.

The display unit 11 is, for example, a liquid crystal display, and displays a recognition number pattern during a recognition number setting process of setting the recognition number. Also, the display unit 11 displays a screen of various types of videos on the basis of the output of the display switching unit 18. Here, a detailed configuration of the display unit 11 will be described with reference to FIG. 3.

Figures 3, 4:
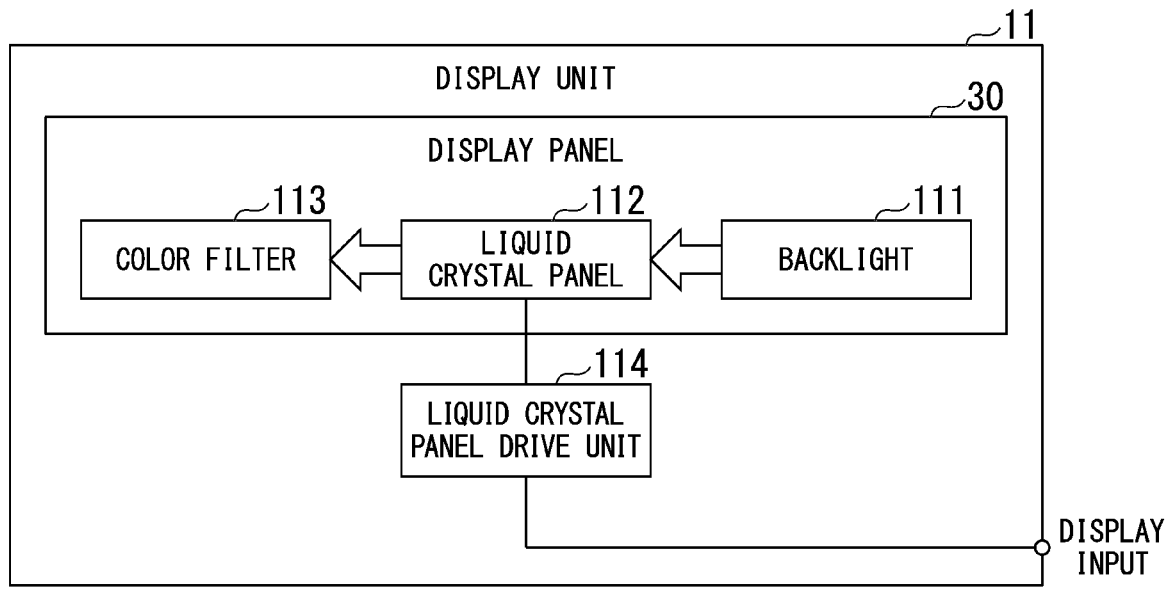
FIG. 3 is a block diagram showing an example of a display unit according to the first embodiment.
FIG. 4 is a diagram showing an example of data of a recognition number list storage unit according to the first embodiment.

FIG. 3 is a block diagram showing an example of the display unit 11 in the present embodiment.

As shown in FIG. 3, the display unit 11 includes a backlight 111, a liquid crystal panel 112, a color filter 113, and a liquid crystal panel drive unit 114. Also, the backlight 111, the liquid crystal panel 112, and the color filter 113 correspond to a display panel 30.

The backlight 111 includes, for example, a light emitting diode, an electroluminescence (EL) panel, and the like, and generates illumination light of the display unit 11. The backlight 111 radiates the generated illumination light from a back surface, which is a surface opposite to a display surface of the liquid crystal panel 112.

The liquid crystal panel 112 modulates luminance of the illumination light radiated from the backlight 111 and irradiates the color filter 113 with the light.

The color filter 113 colors the illumination light whose luminance is modulated via the liquid crystal panel 112 with, for example, three primary colors of light.

The liquid crystal panel drive unit 114 generates a drive signal for the liquid crystal panel 112 on the basis of an output (a display input) of the display switching unit 18 and supplies the drive signal to the liquid crystal panel 112.

Returning to the description of FIG. 2, the remote control signal reception unit 14 (an example of a reception unit) includes, for example, an infrared light receiving element, and receives operation information transmitted by the portable device 20. Here, the operation information represents content of the operation on the display device 10 and the operation information includes, for example, the generation instruction and the regeneration instruction, which have been described above, a hiding instruction for stopping the display of the recognition number pattern, and operation commands such as instructions of various types of operations on the display device 10. The remote control signal reception unit 14 outputs the received operation information (operation command) to the display control unit 13.

The display control unit 13 is, for example, a processor including a central processing unit (CPU) and the like, and integrally controls the display device 10. The display control unit 13 causes output information (for example, a recognition number pattern) representing the recognition number generated by the recognition number generation unit 12 to be output from the display unit 11.

For example, when the recognition number generation instruction has been received via the remote control signal reception unit 14, the display control unit 13 causes the recognition number generation unit 12 to generate the recognition number, causes the recognition number storage unit 15 to store the recognition number, and causes the display pattern generation unit 16 to generate a recognition number pattern representing the recognition number. The display control unit 13 causes the display unit 11 to display the recognition number pattern generated by the display pattern generation unit 16. That is, the display control unit 13 causes the display switching unit 18 to switch from the video output by the video processing unit 17 to the recognition number pattern output by the display pattern generation unit 16 and causes the display unit 11 to display the recognition number pattern.

Also, the display control unit 13 causes the output information representing the regenerated recognition number to be output from the display unit 11. That is, for example, when a recognition number regeneration instruction for the own device (display device 10) has been received via the remote control signal reception unit 14, the display control unit 13 causes the recognition number generation unit 12 to regenerate the recognition number, causes the recognition number storage unit 15 to store the recognition number, and causes the display pattern generation unit 16 to regenerate the recognition number pattern. The display control unit 13 causes the display unit 11 to display the regenerated recognition number pattern via the display switching unit 18.

Also, for example, when the hiding instruction for stopping the display of the recognition number pattern has been received via the remote control signal reception unit 14, the display control unit 13 causes the display switching unit 18 to switch from the recognition number pattern to the video output by the video processing unit 17 and causes the display unit 11 to display the video output by the video processing unit 17.

Also, for example, when an operation command for performing various types of operations on the display device 10 has been received via the remote control signal reception unit 14, the display control unit 13 executes an operation process identifying the operation command.

The portable device 20 includes an imaging unit 21, a device control unit 22, a device storage unit 23, a touch screen 24, and a remote control signal transmission unit 25.

The imaging unit 21 is, for example, a digital camera having an imaging element such as a charge coupled device (CCD) image sensor or a CMOS image sensor, and captures images displayed by the display units 11 of the plurality of display devices 10. That is, the imaging unit 21 captures an image including the recognition number pattern displayed by each display device 10 and outputs the captured image to the device control unit 22.

The device storage unit 23 stores various types of information which is used by the portable device 20. The device storage unit 23 includes a dedicated program storage unit 231 and a recognition number list storage unit 232.

The dedicated program storage unit 231 stores a dedicated program for using the display system 1.

The recognition number list storage unit 232 (an example of an identification information list storage unit) stores information about the recognition numbers identifying the plurality of display devices 10. Here, an example of data of the recognition number list storage unit 232 will be described with reference to FIG. 4.

FIG. 4 is a diagram showing an example of data of the recognition number list storage unit 232 according to the present embodiment.

As shown in FIG. 4, the recognition number list storage unit 232 stores a "recognition number," "detected coordinates," and a "selection state" in association. Here, the "recognition number" is a recognition number identifying each display device 10 and the "detected coordinates" are coordinates on a captured image identifying a position of each of the plurality of display devices 10. Also, the "selection state" indicates whether or not each display device 10 is in a selected state for an operation.

For example, in the example shown in FIG. 4, it is shown that the "detected coordinates" of the display device 10 identifying a "recognition number" of "XXX1" are "(XXX1, XXXX)" and the "selection state" thereof is a "non-selected" state. Also, it is shown that the "detected coordinates" of the display device 10 whose "recognition number" correspond to "XXX2" are "(XXX2, XXXX)" and the "selection state" thereof is a "non-selected" state.

Also, the recognition number list storage unit 232 stores sets of "recognition numbers," "detected coordinates," and "selection states" for the number of display devices 10 provided in the display system 1 as a recognition number list.

Returning to the description of FIG. 2, the touch screen 24 is, for example, a touch panel with a display function, and includes a portable device display unit 241 and a touch coordinate detection unit 242.

The portable device display unit 241 (an example of an operation display unit) is, for example, a liquid crystal display, and displays an operation screen for operating the plurality of display devices 10. Also, the portable device display unit 241 displays an imaging screen when the imaging unit 21 captures the recognition numbers of the plurality of display devices 10.

The touch coordinate detection unit 242 (an example of an operation detection unit) is, for example, a touch panel and detects a user's operation. The touch coordinate detection unit 242, which overlaps the display surface of the portable device display unit 241, is disposed so that touch coordinates on the touch screen 24 (on the display surface of the portable device display unit 241) can be detected. The touch coordinate detection unit 242 detects the touch coordinates touched by the user on the touch screen 24 (on the display surface of the portable device display unit 241). The touch coordinate detection unit 242 outputs the detected touch coordinates to the device control unit 22.

The remote control signal transmission unit 25 (an example of a transmission unit) has, for example, an infrared light emitting element, and transmits operation information (for example, an operation command) representing content of an operation to all of the plurality of display devices 10 or each of the plurality of display devices 10. That is, the operation information includes an operation command (for example, a recognition number generation instruction) for collectively operating all of the display devices 10 and an operation command for operating a specific display device 10 including a recognition number of the display device 10 serving as an operation target (for example, a recognition number generation instruction, various types of operation instructions, and the like).

The device control unit 22 is, for example, a processor including a CPU and the like, and integrally controls the portable device 20. For example, the device control unit 22 causes the imaging unit 21 to capture images displayed by the display units 11 of the plurality of display devices 10. Also, the device control unit 22 detects a recognition number identifying each of the plurality of display devices 10 on the basis of the output information (for example, the recognition number pattern) included in the image captured by the imaging unit 21 and associates the detected recognition number with a position of each of the plurality of display devices 10.

Also, the device control unit 22 includes a recognition number generation instruction unit 221, a recognition number detection unit 222, a button control unit 223, and an operation command processing unit 224. Also, for example, the recognition number generation instruction unit 221, the recognition number detection unit 222, the button control unit 223, and the operation command processing unit 224 are functional units which are implemented by causing the CPU to execute a dedicated program stored in the dedicated program storage unit 231.

The recognition number generation instruction unit 221 causes a plurality of display devices 10 to generate recognition numbers and transmits a recognition number generation instruction for causing the display units 11 to display recognition number patterns representing the recognition numbers to the plurality of display devices 10. That is, the recognition number generation instruction unit 221 causes the remote control signal transmission unit 25 to transmit the recognition number generation instruction to all of the plurality of display devices 10.

Also, the recognition number generation instruction unit 221 transmits a recognition number regeneration instruction to the display device 10 identifying the duplicate recognition number when the recognition number detected by the recognition number detection unit 222 to be described below is duplicate. That is, for example, the recognition number generation instruction unit 221 causes the remote control signal transmission unit 25 to transmit the regeneration instruction including the duplicate recognition number when the recognition number stored in the recognition number list storage unit 232 is duplicate.

Also, the recognition number generation instruction unit 221 extracts generation exclusion information representing a list of recognition numbers identifying the display devices 10 whose recognition numbers are not duplicate on the basis of the recognition number list stored in the recognition number list storage unit 232. When the reproduction instruction is transmitted, the recognition number generation instruction unit 221 transmits the extracted generation exclusion information to the display device 10 identifying the duplicate recognition number. That is, the recognition number generation instruction unit 221 causes the remote control signal transmission unit 25 to transmit a regeneration instruction including the generation exclusion information.

The recognition number detection unit 222 detects a recognition number identifying each of the plurality of display devices 10 on the basis of the recognition number pattern included in the image captured by the imaging unit 21 and associates the detected recognition number with the position of each of the plurality of display devices 10. That is, for example, the recognition number detection unit 222 acquires an image G1 as shown in FIG. 5 from the imaging unit 21 and detects the recognition number identifying each of the plurality of display devices 10 on the basis of the recognition number pattern included in the image.

Figure 5:
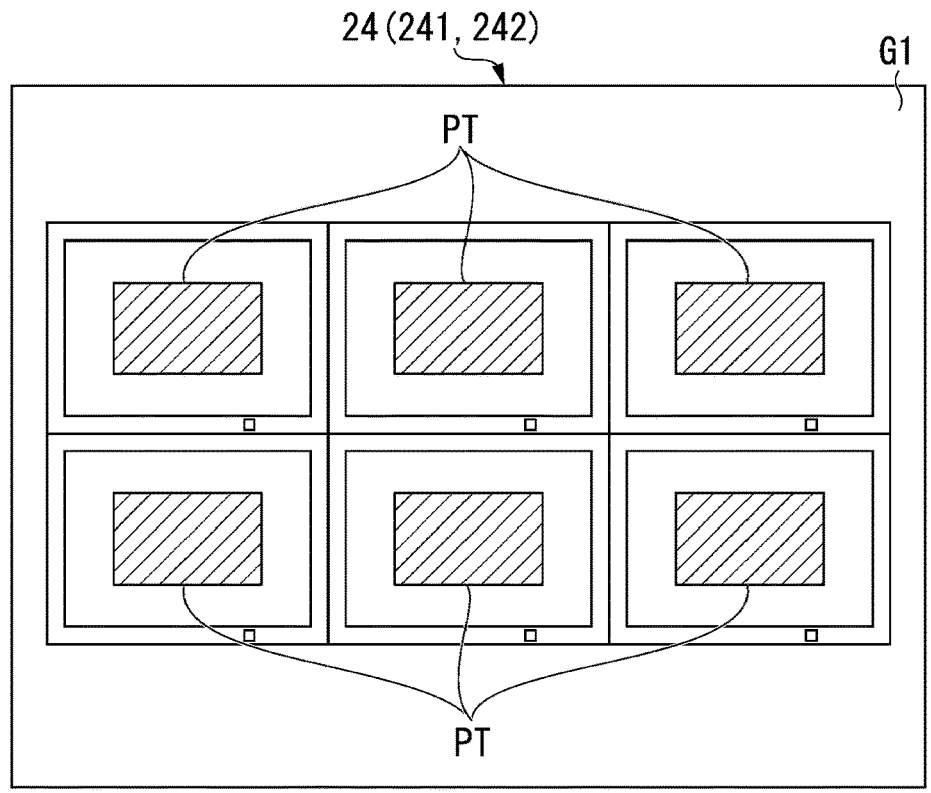
FIG. 5 is a diagram showing an example of a captured image of a recognition number pattern according to the first embodiment.

Also, FIG. 5 is a diagram showing an example of a captured image of the recognition number pattern according to the present embodiment. The image G1 shown in FIG. 5 is a captured image obtained by imaging the plurality of display devices 10 shown in FIG. 1 described above.

For example, the recognition number detection unit 222 associates the detected recognition number with the position of each of the plurality of display devices 10 and causes the recognition number list storage unit 232 to store an association result as shown in FIG. 4. Also, in a process of setting a recognition number (which may be hereinafter referred to as a recognition number setting process), the recognition number detection unit 222 causes the recognition number list storage unit 232 to store "selection states" identifying all the recognition numbers as a "non-selected" state.

The button control unit 223 controls a display process of the portable device display unit 241 and an operation detection process of the touch coordinate detection unit 242. The button control unit 223 causes the portable device display unit 241 to display a selection area where each of the plurality of display devices 10 is selected so that the selection area is displayed in accordance with an arrangement of the plurality of display devices 10 on the basis of the recognition number and the position of each of the plurality of display devices 10 associated by the recognition number detection unit 222. That is, the button control unit 223 causes the arrangement of the plurality of display devices 10 to match an arrangement of selection buttons, for example, as in a selection button area BT1 shown in FIG. 6, on the basis of the recognition number list stored in the recognition number list storage unit 232 and causes the portable device display unit 241 to display selection buttons. Also, coordinates of the display area of the selection button and the selection area identifying each display device 10 are set on the basis of the "detected coordinates" stored in the recognition number list storage unit 232.

Figure 6:
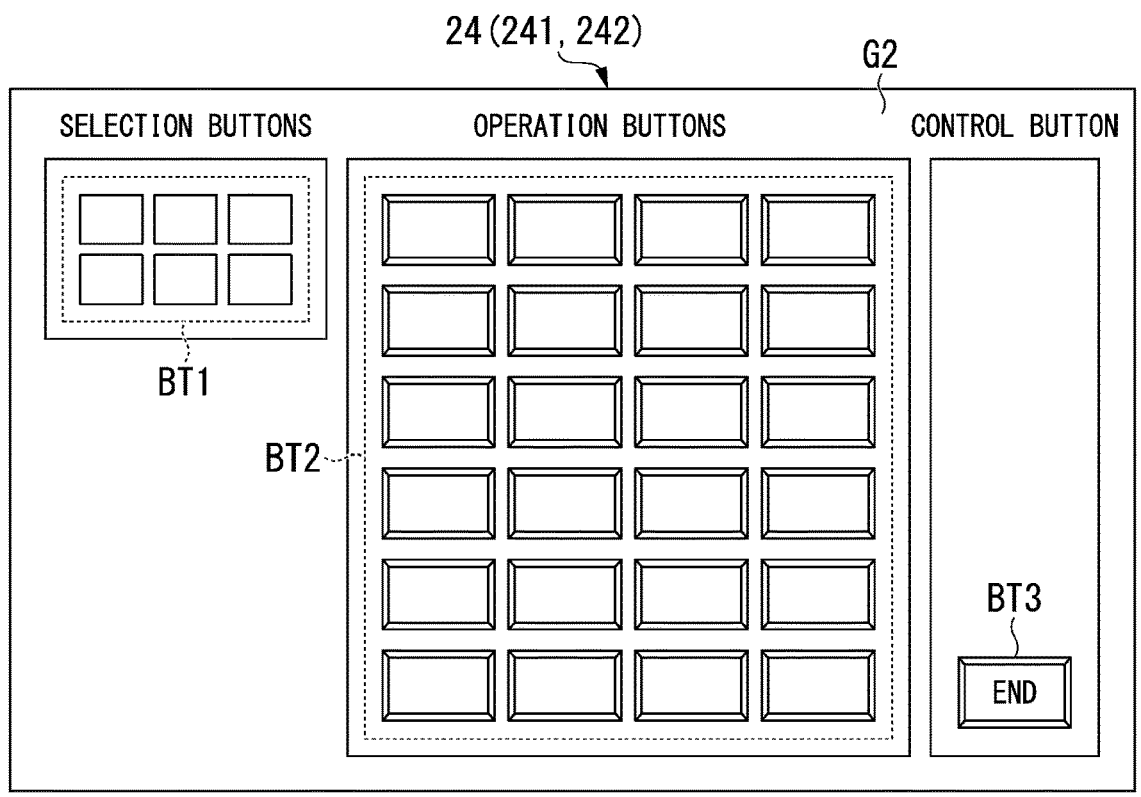
FIG. 6 is a diagram showing an example of an operation screen of portable device according to the first embodiment.

Also, FIG. 6 is a diagram showing an example of an operation screen of the portable device 20 according to the present embodiment.

As shown in FIG. 6, for example, an operation screen G2 includes the selection button area BT1 which is an area of selection buttons for selecting the display devices 10 and an operation button area BT2 which is an area of operation buttons for designating various types of operations, and an end button BT3, which is a control button. The button control unit 223 causes the operation screen G2 to be displayed on the portable device display unit 241.

Also, when the touch coordinate detection unit 242 has detected an operation of selecting the selection area, the button control unit 223 executes an operation of selecting the display device 10 identifying the selection area according to the recognition number. That is, when the selection button (the selection area) of the selection button area BT1 has been selected by the touch coordinate detection unit 242, the button control unit 223 changes the "selection state" of the recognition number list storage unit 232 identifying the recognition number of the display device 10 identifying the selected selection button to a "selected" state.

Also, when the operation button of the operation button area BT2 has been selected by the touch coordinate detection unit 242, the button control unit 223 causes the operation command processing unit 224 to be described below to execute a process of the operation command identifying the selected operation button.

Also, the button control unit 223 causes the portable device display unit 241 to stop a process of displaying the operation screen (for example, the operation screen G2 shown in FIG. 6) when the end button BT3, which is the control button, has been selected by the touch coordinate detection unit 242.

The operation command processing unit 224 causes the remote control signal transmission unit 25 to transmit the operation command identifying the operation button detected by the button control unit 223. For example, the operation command processing unit 224 searches the recognition number list stored in the recognition number list storage unit 232 and extracts a recognition number whose "selection state" is set to be a "selected" state. The operation command processing unit 224 causes the remote control signal transmission unit 25 to transmit the operation command including the extracted recognition number and detected by the button control unit 223.

Next, an operation of the display system 1 according to the present embodiment will be described with reference to the drawings.

Figure 7:
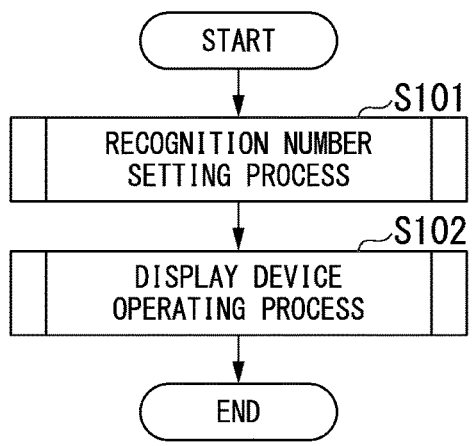
FIG. 7 is a flowchart showing an example of an operation of the portable device according to the first embodiment.

FIG. 7 is a flowchart showing an example of the operation of the portable device 20 according to the present embodiment.

As shown in FIG. 7, the portable device 20 first executes a recognition number setting process (step S101). The portable device 20 causes all of the display devices 10 provided in the display system 1 to generate recognition numbers and causes the display devices 10 to display recognition number patterns representing the generated recognition numbers. The portable device 20 captures the recognition number pattern displayed by the display device 10 through the imaging unit 21, detects the recognition number, and sets the detected recognition number. Details of the recognition number setting process will be described below with reference to FIG. 8.

Next, the portable device 20 executes a process of operating the display device 10 (step S102). Details of the process of operating the display device 10 will be described below with reference to FIG. 9.

Next, details of the processing of step S101 (the recognition number setting process) shown in FIG. 7 will be described with reference to FIG. 8.

Figure 8:
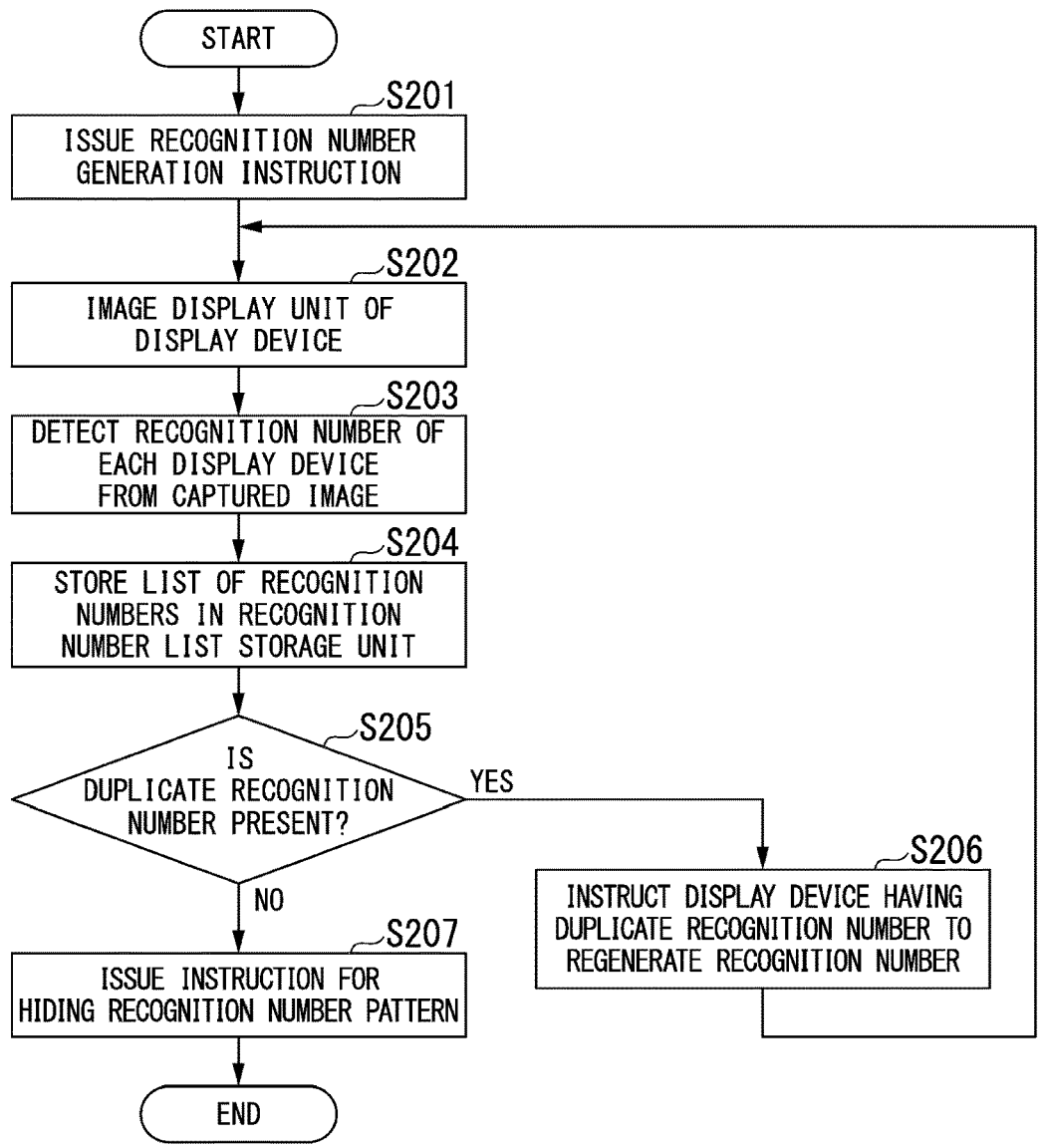
FIG. 8 is a flowchart showing an example of a recognition number setting process of the portable device according to the first embodiment.

FIG. 8 is a flowchart showing an example of the recognition number setting process of the portable device 20 according to the present embodiment.

As shown in FIG. 8, the portable device 20 first instructs the display devices 10 to generate recognition numbers (step S201). For example, the recognition number generation instruction unit 221 of the device control unit 22 transmits a recognition number generation instruction to all the display devices 10 provided in the display system 1 via the remote control signal transmission unit 25.

Next, the portable device 20 images the display units 11 of the display devices 10 (step S202). That is, when each display device 10 displays a recognition number pattern on the display unit 11, the recognition number detection unit 222 of the device control unit 22 causes the imaging unit 21 to capture a captured image including the recognition number patterns.

Next, the recognition number detection unit 222 detects the recognition number of each display device 10 from the captured image (step S203). That is, for example, the recognition number detection unit 222 acquires a captured image such as the image G1 of FIG. 5 from the imaging unit 21 and detects the recognition number identifying each of the plurality of display devices 10 on the basis of the recognition number pattern included in the image.

Next, the recognition number detection unit 222 causes the recognition number list storage unit 232 to store a list of recognition numbers (step S204). For example, the recognition number detection unit 222 associates the detected recognition number with a position of each of the plurality of display devices 10 and causes the recognition number list storage unit 232 to store an association result in as shown in FIG. 4. The recognition number detection unit 222 causes the recognition number list storage unit 232 to store position coordinates (position coordinates of the recognition number pattern) of the display device 10 on the captured image identifying the recognition number as detected coordinates.

Next, the recognition number detection unit 222 determines whether or not a duplicate recognition number is present (step S205). For example, the recognition number detection unit 222 determines whether or not a detected duplicate recognition number is present with reference to the recognition number list stored in the recognition number list storage unit 232. When a duplicate recognition number is present (step S205: YES), the recognition number detection unit 222 moves the process to step S206. Also, when no duplicate recognition number is present (step S205: NO), the recognition number detection unit 222 moves the process to step S207.

In step S206, the recognition number generation instruction unit 221 instructs the display device 10 having the duplicate recognition number to regenerate the recognition number. That is, the recognition number generation instruction unit 221 causes a regeneration instruction including the recognition number identifying the display device 10 having the duplicate recognition number to be transmitted via the remote control signal transmission unit 25.

Also, the recognition number generation instruction unit 221 extracts generation exclusion information representing a list of recognition numbers identifying the display devices 10 whose recognition numbers are not duplicate on the basis of the recognition number list stored in the recognition number list storage unit 232. When the regeneration instruction is transmitted, the recognition number generation instruction unit 221 transmits the extracted generation exclusion information to the display device 10 identifying the duplicate recognition number. After the processing of step S206, the recognition number generation instruction unit 221 causes the process to return to step S202.

Also, in step S207, the device control unit 22 instructs the display device 10 to hide the recognition number pattern. For example, the device control unit 22 transmits an instruction for stopping the display of the recognition number pattern to all the display devices 10 provided in the display system 1 via the remote control signal transmission unit 25. After the processing of step S207, the device control unit 22 ends the recognition number setting process.

Next, details of the processing of step S102 (a process of operating the display device 10) shown in FIG. 7 will be described with reference to FIG. 9.

Figure 9:
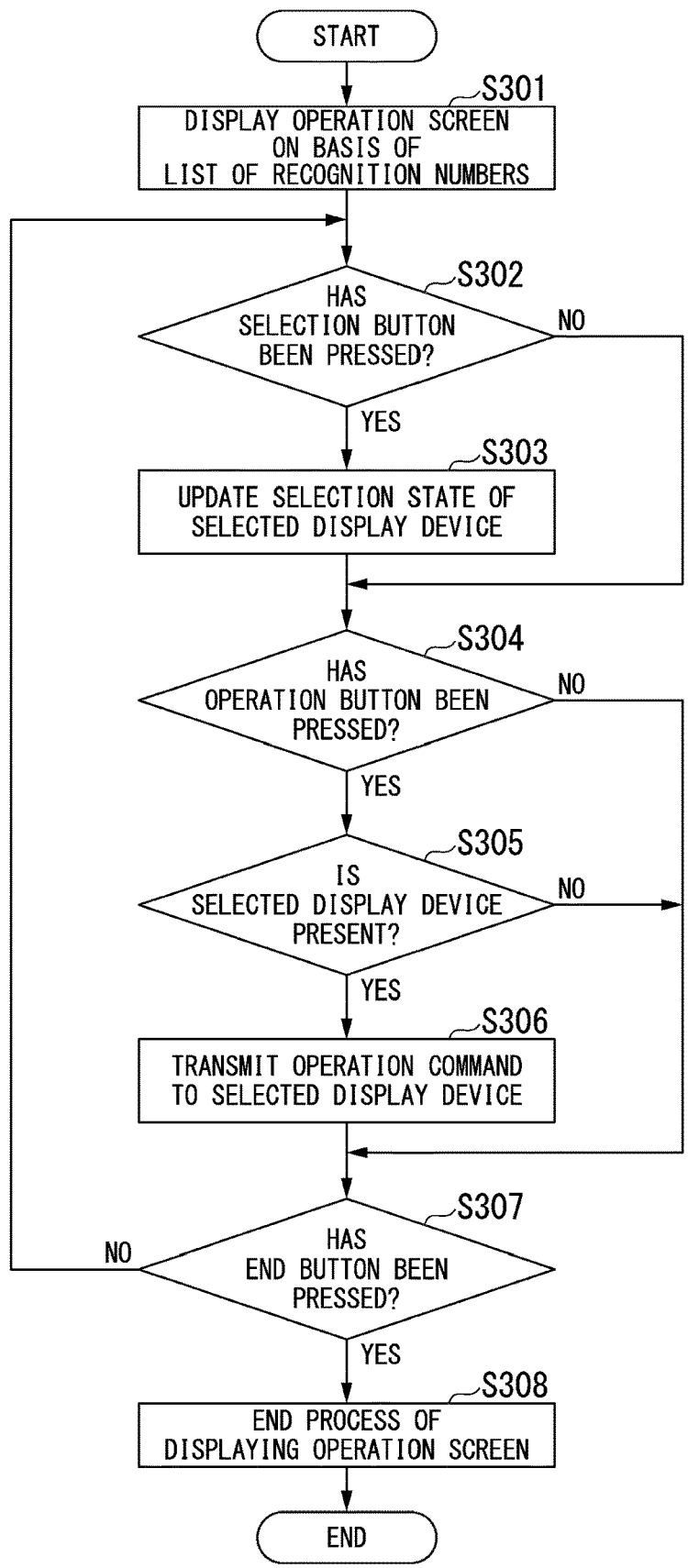
FIG. 9 is a flowchart showing an example of a display device operating process of the portable device according to the first embodiment.

FIG. 9 is a flowchart showing an example of a process of operating the display device 10 in the portable device 20 of the present embodiment.

As shown in FIG. 9, the portable device 20 first displays an operation screen on the basis of the list of recognition numbers (step S301). For example, the button control unit 223 of the device control unit 22 causes the portable device display unit 241 to display the operation screen such as the operation screen G2 shown in FIG. 6 on the basis of the recognition number list stored in the recognition number list storage unit 232. Also, the button control unit 223 causes the portable device display unit 241 to display the arrangement of the selection buttons for selecting the display devices 10 on the operation screen G2 so that the arrangement of the selection buttons matches an actual arrangement of the display devices 10.

Next, the button control unit 223 determines whether or not the selection button has been pressed (step S302). That is, for example, the button control unit 223 determines whether or not a selection button (a selection area) within the selection button area BT1 shown in FIG. 6 has been touched through the touch coordinate detection unit 242. When a selection button has been pressed (step S302: YES), the button control unit 223 moves the process to step S303. Also, when no selection button has been pressed (step S302: NO), the button control unit 223 moves the process to step S304.

In step S303, the button control unit 223 updates the selection state of the selected display device 10. That is, the button control unit 223 changes the "selection state" of the recognition number list storage unit 232 identifying the recognition number of the display device 10 identifying the selected selection button to the "selected" state. Also, the button control unit 223 may be configured to perform a toggle operation so that the state is changed to the "non-selected state" when the selection button has been pressed again. In this case, the button control unit 223 changes the "selection state" of the recognition number list storage unit 232 identifying the recognition number of the display device 10 identifying the selected selection button from the "selected" state to the "non-selected" state or from the "non-selected" state to the "selected" state.

Next, in step S304, the button control unit 223 determines whether or not an operation button has been pressed. That is, for example, the button control unit 223 determines whether or not an operation button within the operation button area BT2 shown in FIG. 6 has been touched through the touch coordinate detection unit 242. The button control unit 223 moves the process to step S305 when an operation button has been pressed (step S304: YES). Also, the button control unit 223 moves the process to step S307 when no operation button has been pressed (step S304: NO).

In step S305, the button control unit 223 determines whether or not a selected display device 10 is present. That is, for example, the button control unit 223 determines whether or not a selected display device 10 is present according to whether or not a recognition number whose selection state is the "selected" state is present with reference to the recognition number list stored in the recognition number list storage unit 232. When a selected display device 10 is present (step S305: YES), the button control unit 223 moves the process to step S306. Also, the button control unit 223 moves the process to step S307 when a selected display device 10 is absent (step S305: NO).

In step S306, the operation command processing unit 224 of the device control unit 22 transmits an operation command to the selected display device 10. The button control unit 223 extracts all the recognition numbers whose selection states are "selected" states with reference to the recognition number list stored in the recognition number list storage unit 232. The button control unit 223 transmits an operation command, which includes a recognition number whose extracted selection state is the "selected" state and corresponds to an operation button selected by the button control unit 223, via the remote control signal transmission unit 25. Also, the button control unit 223 may transmit operation commands for the number of extracted recognition numbers or may include a plurality of recognition numbers in one operation command.

Next, in step S307, the button control unit 223 determines whether or not the end button has been pressed. That is, for example, the button control unit 223 determines whether or not the end button BT3 shown in FIG. 6 has been touched through the touch coordinate detection unit 242. When the end button has been pressed (step S307: YES), the button control unit 223 moves the process to step S308. Also, the button control unit 223 causes the process to return to step S302 when the end button has not been pressed (step S307: NO).

In step S308, the button control unit 223 ends the process of displaying the operation screen and ends the process of operating the display device 10.

Next, the operation of the display device 10 according to the present embodiment will be described with reference to FIG. 10.

Figure 10:
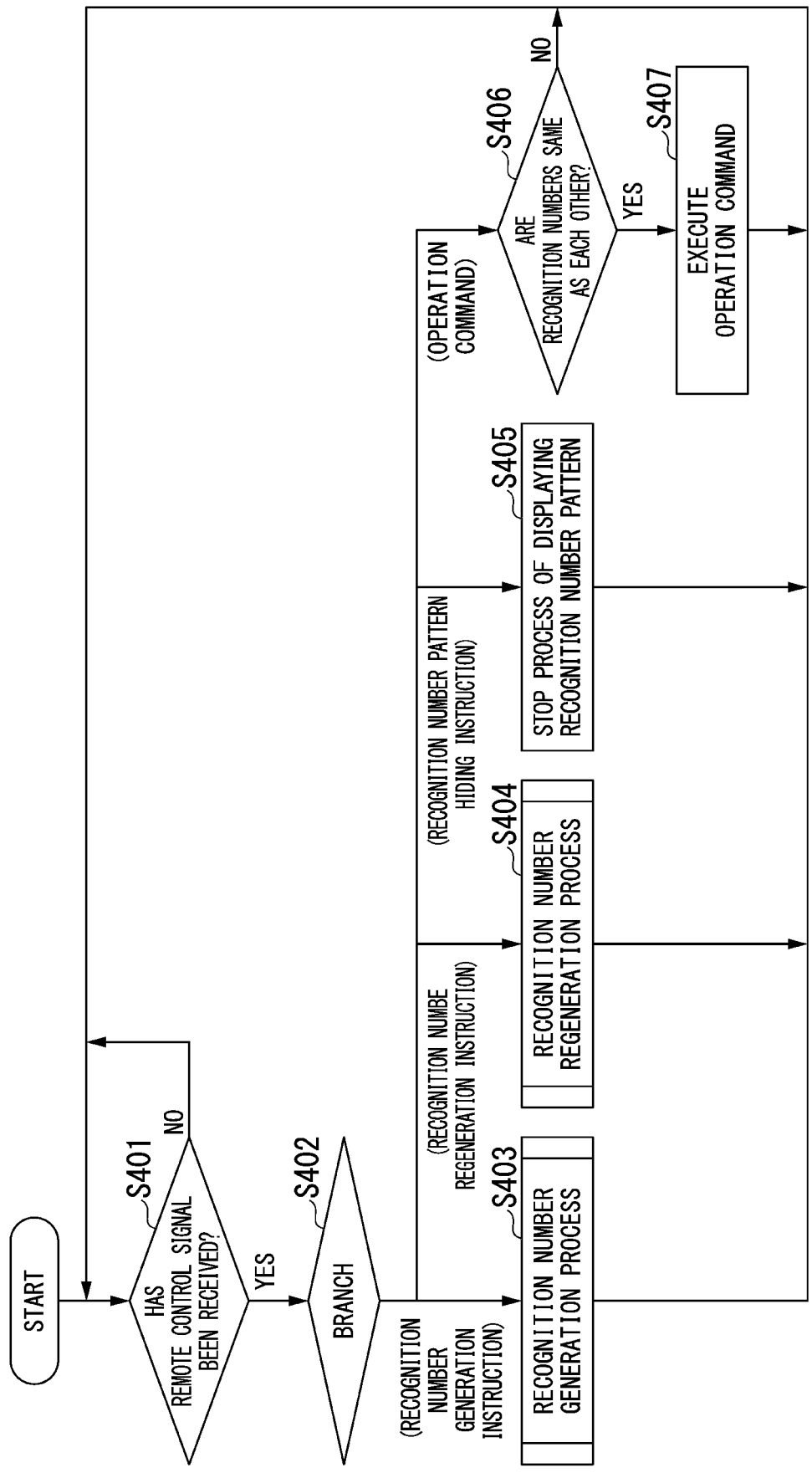
FIG. 10 is a flowchart showing an example of an operation of the display device according to the first embodiment.

FIG. 10 is a flowchart showing an example of the operation of the display device 10 according to the present embodiment.

As shown in FIG. 10, the display device 10 first determines whether or not a remote control signal has been received (step S401). For example, the display control unit 13 of the display device 10 determines whether or not a remote control signal such as an operation command has been received from the portable device 20 via the remote control signal reception unit 14. When a remote control signal has been received (step S401: YES), the display control unit 13 moves the process to step S402. Also, when the display control unit 13 has not received the remote control signal (step S401: NO), the display control unit 13 causes the process to return to step S401.

In step S402, the display control unit 13 executes branch processing in accordance with the received remote control signal. When a recognition number generation instruction has been received as the remote control signal (step S402: a recognition number generation instruction), the display control unit 13 moves the process to step S403. Also, when a recognition number regeneration instruction has been received as the remote control signal (step S402: a recognition number regeneration instruction), the display control unit 13 moves the process to step S404.

Also, when an instruction for hiding the recognition number pattern has been received as the remote control signal (step S402: a recognition number pattern hiding instruction), the display control unit 13 moves the process to step S405. Also, when an operation command has been received as the remote control signal (step S402: an operation command), the display control unit 13 moves the process to step S406.

In step S403, the display control unit 13 executes a recognition number generation process. The display control unit 13 generates a recognition number of its own device and causes the display unit 11 to display a recognition number pattern representing the generated recognition number. Also, details of the recognition number generation process will be described below with reference to FIG. 11. After the processing of step S403, the display control unit 13 causes the process to return to step S401.

Also, in step S404, the display control unit 13 executes a recognition number regeneration process. The display control unit 13 regenerates the recognition number of its own device and causes the display unit 11 to display a recognition number pattern representing the regenerated recognition number. Also, details of the recognition number regeneration process will be described below with reference to FIG. 12. After the processing of step S404, the display control unit 13 causes the process to return to step S401.

Also, in step S405, the display control unit 13 stops a process of displaying the recognition number pattern. That is, the display control unit 13 causes the display switching unit 18 to switch from the recognition number pattern to a video output by the video processing unit 17 and causes the display unit 11 to display the video output by the video processing unit 17. After the processing of step S405, the display control unit 13 causes the process to return to step S401.

Also, in step S406, the display control unit 13 determines whether or not the recognition number included in the operation command is the same as the recognition number of its own device. That is, the display control unit 13 determines whether or not the recognition number stored in the recognition number storage unit 15 is the same as the recognition number included in the operation command. When the recognition numbers are the same as each other (step S406: YES), the display control unit 13 moves the process to step S407. Also, when the recognition numbers are different from each other (step S406: NO), the display control unit 13 causes the process to return to step S401.

In step S407, the display control unit 13 executes the operation command That is, the display control unit 13 executes various types of operation processes according to content of the operation command After the processing of step S407, the display control unit 13 causes the process to return to step S401.

Next, details of the processing of step S403 (a recognition number generation process) shown in FIG. 10 will be described with reference to FIG. 11.

Figure 11:
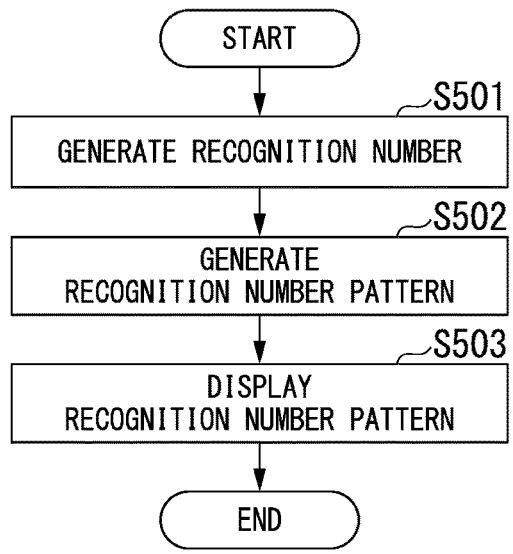
FIG. 11 is a flowchart showing an example of a recognition number generation process of the display device according to the first embodiment.

FIG. 11 is a flowchart showing an example of the recognition number generation process of the display device 10 according to the present embodiment.

As shown in FIG. 11, the display device 10 first generates a recognition number (step S501). That is, the display control unit 13 of the display device 10 causes the recognition number generation unit 12 to generate the recognition number. For example, the recognition number generation unit 12 may generate a random number generated using a random number generator (not shown) (or a number based on the random number) as a recognition number.

Also, for example, the recognition number generation unit 12 may generate a recognition number when a plurality of lists representing the order in which recognition numbers are generated are provided, a list to be used is selected on the basis of the random number generated by the random number generator, and the recognition numbers present in the selected list are sequentially allocated. As described above, the recognition number generation unit 12 may be configured to generate the recognition number on the basis of the random number.

Also, the recognition number generation unit 12 causes the recognition number storage unit 15 to store the generated recognition number.

Next, the display device 10 generates a recognition number pattern (step S502). That is, the display control unit 13 causes the recognition number generation unit 12 to generate the recognition number. For example, the display pattern generation unit 16 generates a recognition number pattern such as a bar code which is a one-dimensional code or a QR code (registered trademark) which is a two-dimensional code from the recognition number stored in the recognition number storage unit 15. The display pattern generation unit 16 outputs the generated recognition number pattern to the display switching unit 18.

Next, the display device 10 displays the recognition number pattern (step S503). That is, the display control unit 13 causes the display switching unit 18 to switch from the video output by the video processing unit 17 to the recognition number pattern output by the display pattern generation unit 16 and causes the display unit 11 to display the recognition number pattern. After the processing of step S503, the display control unit 13 ends the recognition number generation process.

Next, details of the processing of step S404 (a recognition number regeneration process) shown in FIG. 10 will be described with reference to FIG. 12.

Figure 12:
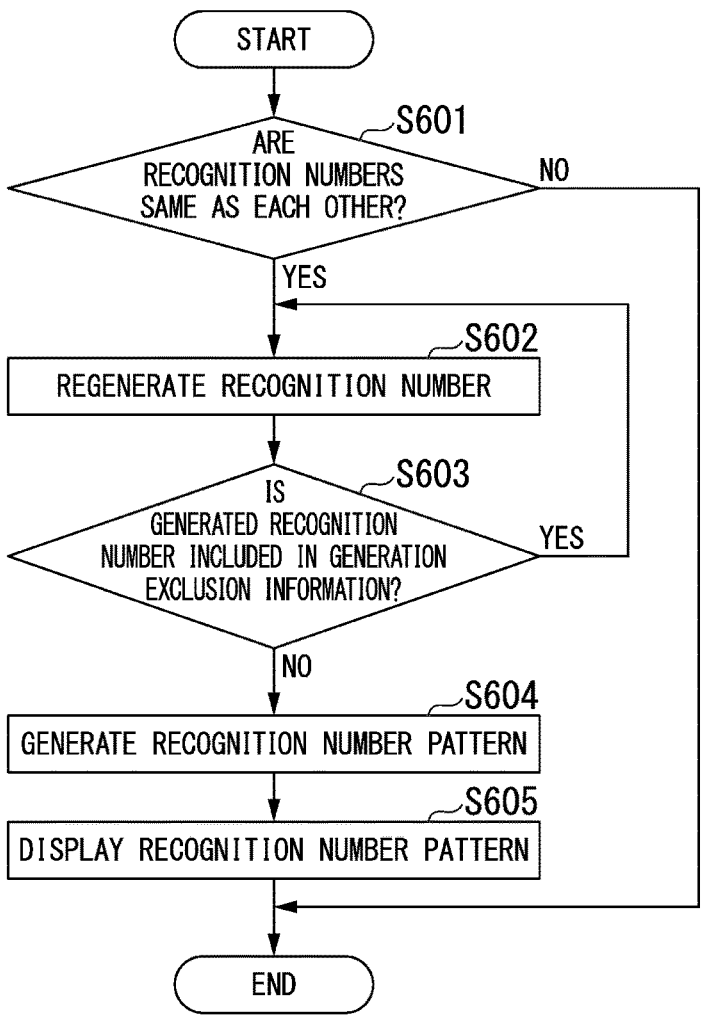
FIG. 12 is a flowchart showing an example of a recognition number regeneration process of the display device according to the first embodiment.

FIG. 12 is a flowchart showing an example of the recognition number regeneration process of the display device 10 according to the present embodiment.

As shown in FIG. 12, the display device 10 determines whether or not a recognition number included in a regeneration instruction is the same as a recognition number of its own device (step S601). That is, the display control unit 13 of the display device 10 determines whether or not the recognition number stored in the recognition number storage unit 15 is the same as the recognition number included in the regeneration instruction. When the recognition numbers are the same as each other (step S601: YES), the display control unit 13 moves the process to step S602. Also, when the recognition numbers are different from each other (step S601: NO), the display control unit 13 ends the recognition number regeneration process.

In step S602, the display device 10 regenerates the recognition number. The display control unit 13 causes the recognition number generation unit 12 to regenerate the recognition number, so that the recognition number generation unit 12 regenerates the recognition number.

Next, the recognition number generation unit 12 determines whether or not the generated recognition number is included in generation exclusion information (step S603). The recognition number generation unit 12 determines whether or not the generation exclusion information received from the portable device 20 includes the regenerated recognition number. When the generated recognition number is included in the generation exclusion information (step S603: YES), the recognition number generation unit 12 causes the process to return to step S602. Also, the recognition number generation unit 12 moves the process to step S604 when the generated recognition number is not included in the generation exclusion information (step S603: NO).

Subsequently, because the processing of steps S604 and S605 is similar to the above-described processing of steps S502 and S503 shown in FIG. 11, description thereof will be omitted here. After the processing of step S605, the display control unit 13 ends the recognition number regeneration process.

As described above, the display system 1 according to the present embodiment includes the plurality of display devices 10 and the portable device 20 for operating the plurality of display devices 10. Each of the plurality of display devices 10 includes the recognition number generation unit 12 (the identification information generation unit) and the display control unit 13. The recognition number generation unit 12 generates a recognition number (identification information) for identifying its own device (display device 10). The display control unit 13 causes a recognition number pattern (output information) representing the recognition number generated by the recognition number generation unit 12 to be output from the display unit 11. Also, the portable device 20 includes the imaging unit 21 and the device control unit 22. The imaging unit 21 captures images which are displayed by the display units 11 of the plurality of display devices 10. The device control unit 22 detects a recognition number identifying each of the plurality of display devices 10 on the basis of the recognition number pattern included in the image captured by the imaging unit 21 and associates the detected recognition number with a position of each of the plurality of display devices 10.

Thereby, in the display system 1 according to the present embodiment, each of the plurality of display devices 10 can independently generate and set a recognition number (identification information). For example, a complicated operation such as an operation of presetting a recognition number is not required. Also, the display system 1 according to the present embodiment causes a recognition number pattern representing a recognition number generated by each of the plurality of display devices 10 to be output from the display unit 11, so that the portable device 20 can easily associate the recognition number with a position of each of the plurality of display devices 10. For example, the display system 1 according to the present embodiment can set different recognition numbers in all the display devices 10 only by directing the imaging unit 21 of the portable device 20 such that the recognition number patterns displayed on all the display devices 10 included in the display system 1 can be imaged. Consequently, the display system 1 according to the present embodiment can improve the convenience, for example, when a multi-display process in which a plurality of display devices 10 are disposed side by side and used is performed.

Also, in the present embodiment, the portable device 20 includes the touch screen 24 having the portable device display unit 241 (an operation display unit) configured to display the operation screen for operating the plurality of display devices 10 and the touch coordinate detection unit 242 (an operation detection unit) configured to detect a user's operation. The device control unit 22 causes the portable device display unit 241 to display a selection button (a selection area) for selecting each of the plurality of display devices 10 so that the selection button (the selection area) is displayed in accordance with an arrangement of the plurality of display devices 10 on the basis of the recognition number and the position of each of the plurality of display devices 10 that have been associated. When the touch coordinate detection unit 242 has detected an operation of selecting the selection button, the device control unit 22 executes the operation of selecting the display device 10 identifying the selection button according to the recognition number.

Thereby, in the display system 1 according to the present embodiment, for example, the user can select the display device 10 desired to be operated using the selection buttons disposed in accordance with an actual arrangement of the display devices 10 displayed on the portable device display unit 241 of the portable device 20 and easily operate the display device 10. Consequently, the display system 1 according to the present embodiment can further improve the convenience.

Also, in the present embodiment, when the detected recognition number is duplicate, the device control unit 22 transmits a recognition number regeneration instruction to the display device 10 identifying the duplicate recognition number. The recognition number generation unit 12 regenerates the recognition number when a regeneration instruction for its own device (display device 10) has been received. The display control unit 13 causes a recognition number pattern representing the regenerated recognition number to be output from the display unit 11.

Thereby, the display system 1 according to the present embodiment can easily set different recognition numbers in all the display devices 10 because the display device 10 identifying the duplicate recognition number is allowed to regenerate the recognition number when the recognition number is duplicate.

Also, in the present embodiment, when a regeneration instruction is transmitted to the display device 10 identifying the duplicate recognition number, the device control unit 22 transmits generation exclusion information representing a list of recognition numbers identifying the display devices 10 whose recognition numbers are not duplicate among the plurality of display devices 10. When the regeneration instruction for the own device (display device 10) has been received, the recognition number generation unit 12 regenerates a recognition number other than the recognition numbers included in the generation exclusion information.

Thereby, in the display system 1 according to the present embodiment, it is possible to efficiently regenerate a recognition number because the display device 10 regenerates a recognition number other than the recognition numbers set in the other display devices 10 using the generation exclusion information.

Also, in the present embodiment, each of the plurality of display devices 10 includes the display pattern generation unit 16 (a pattern generation unit) configured to generate a display pattern (for example, a recognition number pattern) representing a recognition number as output information. The display control unit 13 causes the display unit 11 to display the display pattern generated by the display pattern generation unit 16. The device control unit 22 detects a recognition number identifying each of the plurality of display devices 10 on the basis of a display pattern (for example, a recognition number pattern) included in the image captured by the imaging unit 21.

Thereby, in the display system 1 according to the present embodiment, the portable device 20 can easily detect the recognition number when the imaging unit 21 captures an image including the display pattern (for example, the recognition number pattern).

Also, in the present embodiment, the display unit 11 includes the display panel 30 configured to display an image.

Thereby, for example, the display system 1 according to the present embodiment improves the convenience when a multi-display process in which a plurality of display devices 10 are disposed side by side and used is performed using the display devices 10 including the display panel 30.

Also, in the present embodiment, the portable device 20 includes the remote control signal transmission unit 25 (a transmission unit) configured to transmit operation information representing content of an operation to all of the plurality of display devices 10 or each of the plurality of display devices 10. Each of the plurality of display devices 10 includes the remote control signal reception unit 14 (a reception unit) configured to receive the operation information transmitted by the portable device 20.

Thereby, in the display system 1 according to the present embodiment, the portable device 20 can appropriately operate the plurality of display devices 10 using the remote control signal transmission unit 25 (the transmission unit) and the remote control signal reception unit 14 (the reception unit).

Also, in the present embodiment, the recognition number generation unit 12 generates a recognition number on the basis of a random number.

Thereby, the display system 1 according to the present embodiment can efficiently generate a recognition number while reducing redundancy between recognition numbers.

Also, in the present embodiment, the portable device 20 includes the recognition number list storage unit 232 (an identification information list storage unit) in which a recognition number and selection state information (for example, a "selection state") representing whether or not the display device 10 identifying the recognition number is in the selected state are stored in association. The device control unit 22 transmits operation information to the display device 10 identifying a recognition number in which the selection state information (for example, the "selection state") represents a selected state (for example, "selected") among the recognition numbers stored in the recognition number list storage unit 232.

Thereby, the display system 1 according to the present embodiment can operate a plurality of display devices 10, which have been selected, at once by changing a plurality of selection station information elements (for example, "selection states") stored in the recognition number list storage unit 232 to the selected state (for example, "selected"). Consequently, the display system 1 according to the present embodiment can further improve the convenience.

Also, the control method according to the present embodiment is a method of controlling the display system 1 including the plurality of display devices 10 and the portable device 20 for operating the plurality of display devices 10 and includes an identification information generation step and a display control step, an imaging step, and a device control step. In the identification information generation step, each of the plurality of display devices 10 generates a recognition number (identification information) for identifying its own device. In the display control step, each of the plurality of display devices 10 causes a recognition number pattern (output information) representing the recognition number generated in the identification information generation step to be output from the display unit 11. In the imaging step, the portable device 20 captures images displayed by the display units 11 of the plurality of display devices 10. In the device control step, the portable device 20 detects a recognition number identifying each of the plurality of display devices 10 on the basis of output information included in the image captured in the imaging step and associates the detected recognition number with a position of each of the plurality of display devices 10.

Thereby, the control method according to the present embodiment has effects similar to those of the above-described display system 1 and enables the convenience to be improved.

Second Embodiment

Next, a display system 1a according to a second embodiment will be described with reference to the drawings.

Also, in the present embodiment, a modified example in which the display system 1 of the first embodiment described above is applied to a projector instead of a liquid crystal display will be described.

Figure 13:
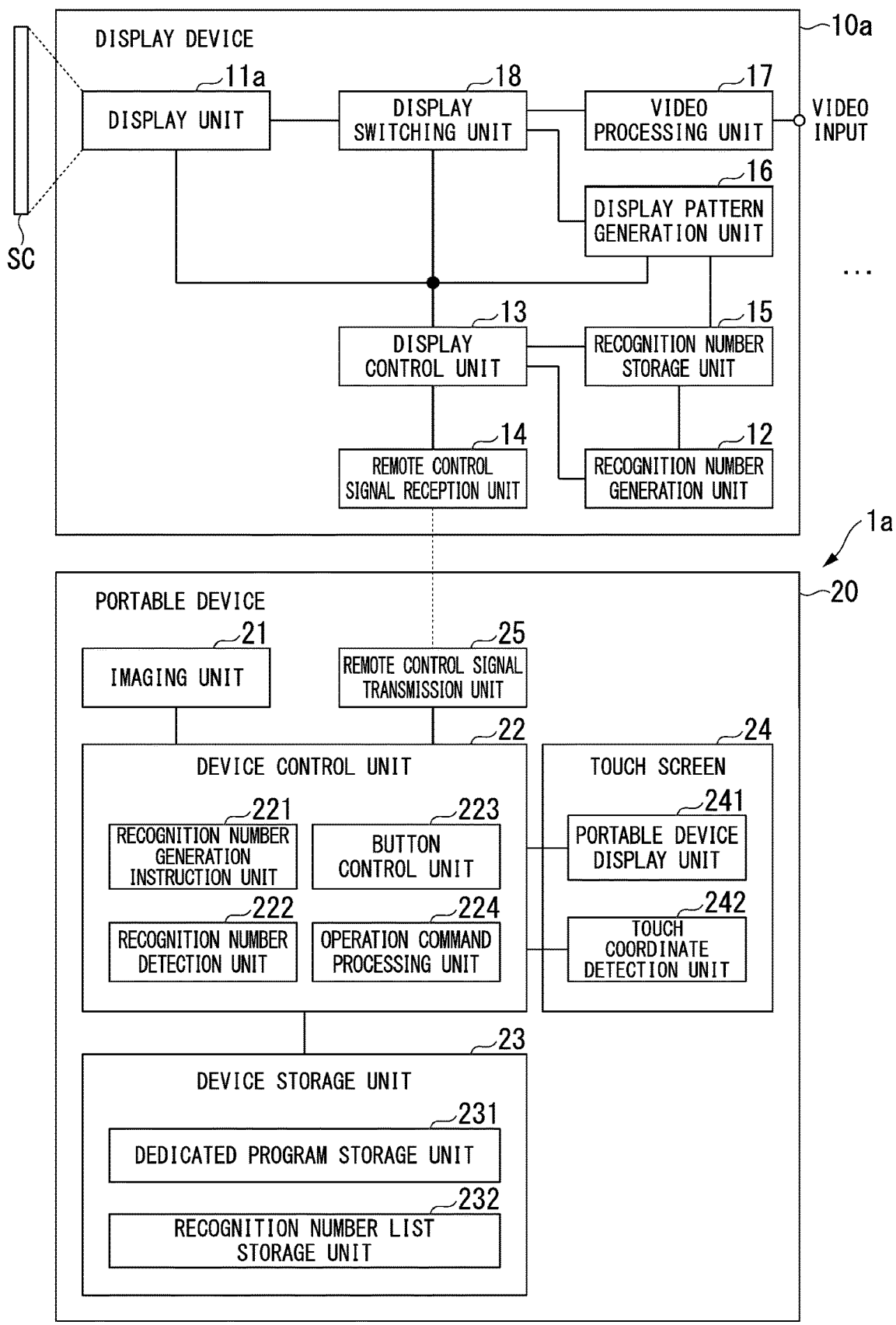
FIG. 13 is a block diagram showing an example of a display system according to a second embodiment.

FIG. 13 is a block diagram showing an example of the display system 1a according to the present embodiment.

As shown in FIG. 13, the display system 1a includes a plurality of display devices 10a and portable device 20. Also, in FIG. 13, as in FIG. 2 described above, one of the plurality of display devices 10a will be described and description of the other display devices 10a will be omitted. Also, in FIG. 13, the same reference signs denote components that are the same as those in FIG. 2 and description thereof will be omitted.

The display device 10a includes a display unit 11a, a recognition number generation unit 12, a display control unit 13, a remote control signal reception unit 14, a recognition number storage unit 15, a display pattern generation unit 16, a video processing unit 17, and a display switching unit 18. The display device 10a is similar to that of the first embodiment except that the display unit 11 of the first embodiment is replaced with the display unit 11a.

The display unit 11a is, for example, a projector, and projects an image onto a screen SC (an example of a display target). For example, the display unit 11a displays a recognition number pattern at the time of a recognition number setting process of setting a recognition number. Also, the display unit 11a displays a screen of various types of videos on the screen SC on the basis of an output of the display switching unit 18. Here, a detailed configuration of the display unit 11a will be described with reference to FIG. 14.

Figure 14:
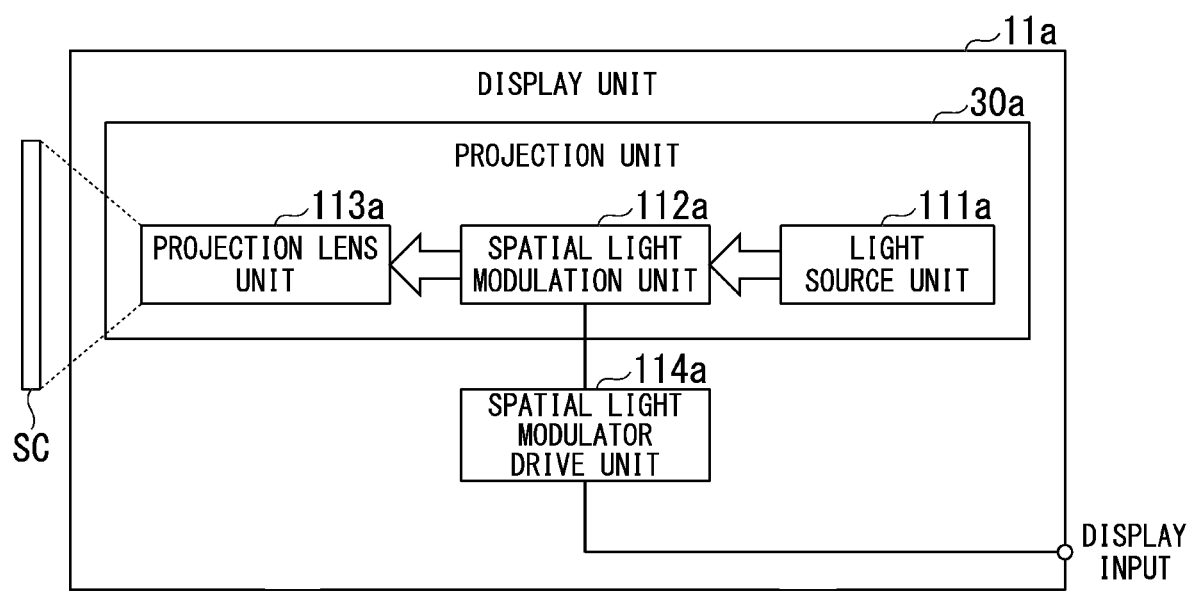
FIG. 14 is a block diagram showing an example of a display unit according to the second embodiment.

FIG. 14 is a block diagram showing an example of the display unit 11a according to the present embodiment.

As shown in FIG. 14, the display unit 11a includes a light source unit 111a, a spatial light modulation unit 112a, a projection lens unit 113a, and a spatial light modulator drive unit 114a. Also, the light source unit 111a, the spatial light modulation unit 112a, and the projection lens unit 113a correspond to a projection unit 30a.

The light source unit 111a generates illumination light of the projector. The light source unit 111a irradiates the spatial light modulation unit 112a with the generated illumination light.

The spatial light modulation unit 112a modulates the illumination light radiated from the light source unit 111a and irradiates the projection lens unit 113a with the light. For the spatial light modulation unit 112a, for example, a liquid crystal panel which is a transmissive device, a reflective liquid crystal panel which is a reflective device, a digital micromirror device (DMD), or the like is used.

The projection lens unit 113a projects the illumination light modulated via the spatial light modulation unit 112a onto, for example, the screen SC. Here, the screen SC is an example of a display target.

The spatial light modulator drive unit 114a generates a drive signal of the spatial light modulation unit 112a on the basis of an output (a display input) of the display switching unit 18 and supplies the drive signal to the spatial light modulation unit 112a.

Also, because the operation of the display system 1a according to the present embodiment is similar to that of the first embodiment except that the display unit 11 is replaced with the display unit 11a, description thereof will be omitted here.

As described above, the display system 1a according to the present embodiment includes the plurality of display devices 10a and the portable device 20 for operating the plurality of display devices 10a. The display control unit 13 causes the display unit 11a to output a recognition number pattern (output information) representing a recognition number generated by the recognition number generation unit 12. The imaging unit 21 captures images displayed by the display units 11a of the plurality of display devices 10a. The device control unit 22 detects a recognition number identifying each of the plurality of display devices 10a on the basis of the recognition number pattern included in the image captured by the imaging unit 21 and associates the detected recognition number with a position of each of the plurality of display devices 10a.

Thereby, the display system 1a according to the present embodiment has effects similar to those of the first embodiment described above and can improve the convenience.

Also, in the present embodiment, the display unit 11a includes the projection unit 30a configured to project an image onto the screen SC (the display target).

Thereby, for example, the display system 1a according to the present embodiment can improve the convenience when a multi-display process in which the plurality of display devices 10a are disposed side by side and used is performed using the display devices 10a including the projection unit 30a.

Third Embodiment

Next, a display system 1b according to a third embodiment will be described with reference to the drawings.

Also, in the present embodiment, a modified example when the output information in the display system 1 of the first embodiment described above is applied with modulated luminance (a modulated signal) instead of the recognition number pattern will be described.

Figure 15:
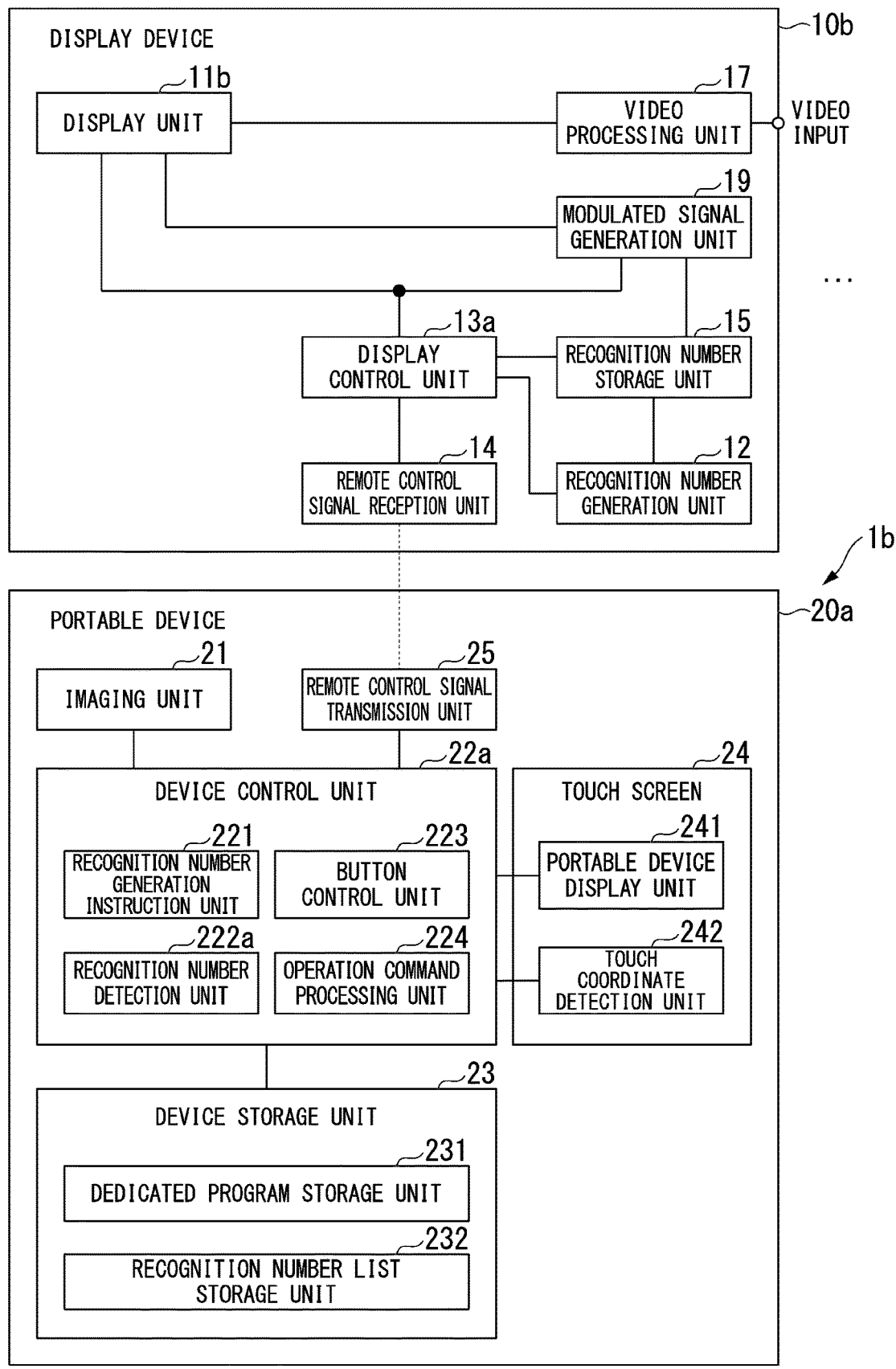
FIG. 15 is a block diagram showing an example of a display system according to a third embodiment.

FIG. 15 is a block diagram showing an example of the display system 1b according to the present embodiment.

As shown in FIG. 15, the display system 1b includes a plurality of display devices 10b and portable device 20a. Also, in FIG. 15, as in FIG. 2 described above, one of the plurality of display devices 10b will be described and description of the other display devices 10b will be omitted. Also, in FIG. 15, the same reference signs denote components that are the same as those in FIG. 2 and description thereof will be omitted.

The display device 10b includes a display unit 11b, a recognition number generation unit 12, a display control unit 13a, a remote control signal reception unit 14, a recognition number storage unit 15, a video processing unit 17, and a modulated signal generation unit 19. The display device 10b is similar to the display device of the first embodiment except that a modulated signal generation unit 19 is provided instead of the display pattern generation unit 16 and the display switching unit 18 and the display control unit 13 and the display unit 11 are replaced by the display control unit 13a and the display unit 11b.

The modulated signal generation unit 19 generates a modulated signal representing a recognition number as output information on the basis of control of the display control unit 13a. Here, the modulated signal is a signal in which the recognition number is coded and is a signal for modulating the luminance of a backlight 111 at a frequency higher than a video frame frequency. The modulated signal generation unit 19 generates the modulated signal from the recognition number stored in the recognition number storage unit 15. The modulated signal generation unit 19 outputs the generated modulated signal to the display unit 11b.

The display unit 11b is, for example, a liquid crystal display, and modulates the luminance of the backlight 111 with a modulated signal representing a recognition number during a recognition number setting process of setting the recognition number. Also, the display unit 11b displays a screen of various types of videos on the basis of an output of the video processing unit 17. Here, a detailed configuration of the display unit 11b will be described with reference to FIG. 16.

Figure 16:
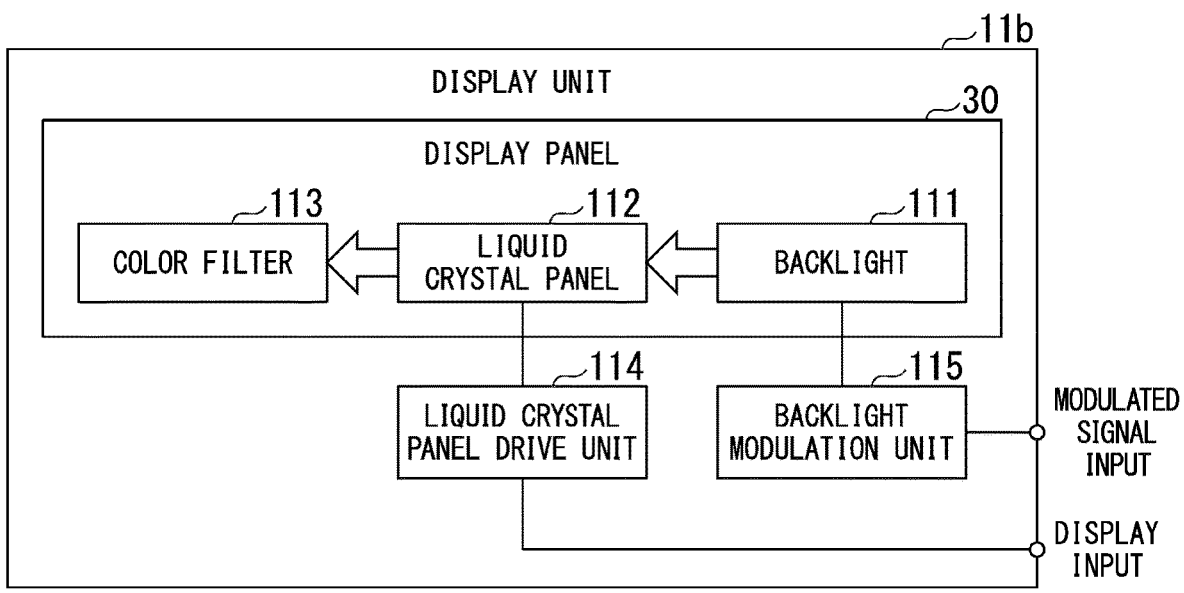
FIG. 16 is a block diagram showing an example of a display unit according to the third embodiment.

FIG. 16 is a block diagram showing an example of the display unit 11b according to the present embodiment.

As shown in FIG. 16, the display unit 11b includes the backlight 111, a liquid crystal panel 112, a color filter 113, a liquid crystal panel drive unit 114, and a backlight modulation unit 115. Also, the backlight 111, the liquid crystal panel 112, and the color filter 113 correspond to a display panel 30.

The backlight modulation unit 115 modulates the luminance of the backlight 111 on the basis of the modulated signal supplied from the modulated signal generation unit 19. Also, because the luminance of the backlight 111 is modulated at a frequency higher than a video frame frequency, a change in luminance cannot be visually recognized by the human eye.

Returning to the description of FIG. 15, for example, the display control unit 13a is a processor including a CPU and the like and integrally controls the display device 10b. The display control unit 13a causes output information (for example, modulated luminance) representing the recognition number generated by the recognition number generation unit 12 to be output from the display unit 11. That is, the display control unit 13a modulates the luminance of the display unit 11b on the basis of a modulated signal generated by the modulated signal generation unit 19 and causes the modulated luminance to be output.

Also, the display control unit 13a is similar to the display control unit 13 of the first embodiment in other processes except that the display control unit 13a causes the modulated signal generation unit 19 to generate a modulated signal representing a recognition number and causes the backlight modulation unit 115 of the display unit 11b to modulate the luminance of the backlight 111 on the basis of the modulated signal. Thus, description of the other processes of the display control unit 13a will be omitted here.

The portable device 20a includes an imaging unit 21, a device control unit 22a, a device storage unit 23, a touch screen 24, and a remote control signal transmission unit 25.

The device control unit 22a is, for example, a processor including a CPU and the like, and integrally controls the portable device 20a. For example, the device control unit 22a causes the imaging unit 21 to capture an image displayed by the display units 11b of the plurality of display devices 10b. Also, the device control unit 22a detects a recognition number identifying each of the plurality of display devices 10b on the basis of the output information (for example, modulated luminance) included in the image captured by the imaging unit 21 and associates the detected recognition number with a position of each of the plurality of display devices 10b.

Also, the device control unit 22a includes a recognition number generation instruction unit 221, a recognition number detection unit 222a, a button control unit 223, and an operation command processing unit 224. Also, for example, the recognition number generation instruction unit 221, the recognition number detection unit 222a, the button control unit 223, and the operation command processing unit 224 are functional units implemented by causing the CPU to execute a dedicated program stored in the dedicated program storage unit 231.

The recognition number detection unit 222a detects a recognition number identifying each of the plurality of display devices 10b on the basis of the recognition number pattern included in the image captured by the imaging unit 21 and associates the detected recognition number with a position of each of the plurality of display devices 10b. The recognition number detection unit 222a detects the recognition number identifying each of the plurality of display devices 10b by detecting a change in the luminance of the image and demodulating a change in the luminance (modulated luminance). The recognition number detection unit 222a associates the detected recognition number with the position of each of the plurality of display devices 10b and causes the recognition number list storage unit 232 to store an association result, for example, as shown in FIG. 4.

Because the other components and processes of the portable device 20a are similar to those of the portable device 20 of the first embodiment, description thereof will be omitted here.

As described above, the display system 1b according to the present embodiment includes the plurality of display devices 10b and the portable device 20a for operating the plurality of display devices 10b. The display control unit 13a causes modulated luminance (output information) representing the recognition number generated by the recognition number generation unit 12 to be output from the display unit 11b. The imaging unit 21 captures images displayed by the display units 11b of the plurality of display devices 10b. The device control unit 22a detects a recognition number identifying each of the plurality of display devices 10b on the basis of the modulated luminance included in the image captured by the imaging unit 21 and associates the detected recognition number with a position of each of the plurality of display devices 10b.

Thereby, the display system 1b according to the present embodiment has effects similar to those of the first embodiment described above and the convenience can be improved.

Also, in the present embodiment, each of the plurality of display devices 10b includes a modulated signal generation unit 19 configured to generate a modulated signal representing a recognition number as output information. The display control unit 13a modulates the luminance of the display unit 11b on the basis of the modulated signal generated by the modulated signal generation unit 19 and causes the modulated luminance to be output. The device control unit 22a detects a recognition number identifying each of the plurality of display devices 10b on the basis of the modulated luminance (for example, a change in luminance) of the display unit 11b included in the image captured by the imaging unit 21.

Thereby, in the display system 1b according to the present embodiment, the portable device 20a can easily detect the recognition number when the imaging unit 21 captures the change in the luminance of the image.

Also, in the present embodiment, the modulated signal generated by the modulated signal generation unit 19 has a frequency higher than the display frame frequency of the display unit 11b.

Thereby, in the display system 1b according to the present embodiment, the recognition number can be easily set without making the user visually recognize (i.e., in a state in which the user is not aware that the recognition number is set).

Fourth Embodiment

Next, a display system 1c according to a fourth embodiment will be described with reference to FIG. 17. Also, in the present embodiment, a basic configuration example of the present invention will be described.

Figure 17:
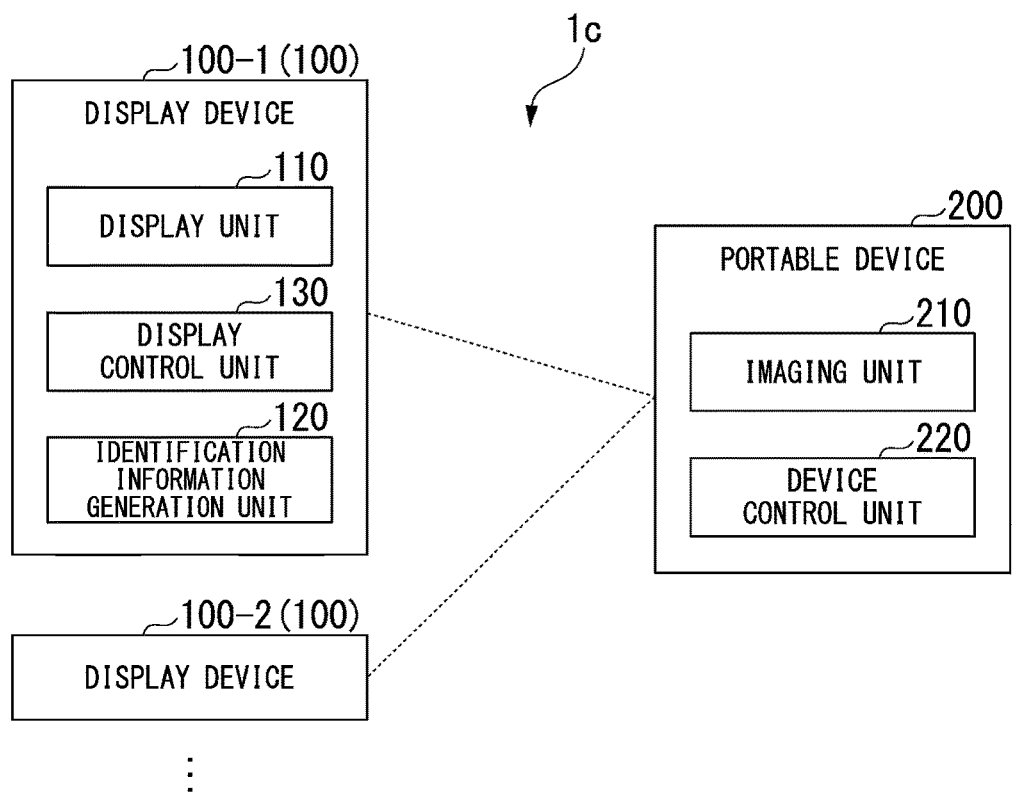
FIG. 17 is a block diagram showing an example of a display system according to a fourth embodiment.

FIG. 17 is a block diagram showing an example of the display system 1c according to the present embodiment.

As shown in FIG. 17, the display system 1c includes a plurality of display devices 100 (100-1, 100-2, and the like) and portable device 200. The display system 1c is a system for performing a multi-display process in which a plurality of display devices 100 are disposed side by side and used and the display devices 100 are operated from the portable device 200.

Also, in the present embodiment, the display devices 100-1, 100-2, and the like have the same configuration. When any display device provided in the display system 1c is shown or when the display devices are not particularly distinguished, the display device will be described as the display device 100.

Each of the plurality of display devices 100 includes a display unit 110, an identification information generation unit 120, and a display control unit 130. The identification information generation unit 120 generates identification information (for example, a recognition number) for identifying its own device. The display control unit 130 causes output information representing the identification information generated by the identification information generation unit 120 to be output from the display unit 110. The output information is, for example, a display pattern representing the identification information, modulated luminance representing the identification information, or the like.

The portable device 200 operates the plurality of display devices 100. The portable device 200 includes an imaging unit 210 and a device control unit 220. The imaging unit 210 captures images displayed by the display units 110 of the plurality of display devices 100. The device control unit 220 detects recognition information identifying each of the plurality of display devices 100 on the basis of the output information included in the image captured by the imaging unit 210 and associates the detected recognition information with a position of each of the plurality of display devices 100.

Thereby, in the display system 1c according to the present embodiment, each of the plurality of display devices 100 can independently generate and set identification information, and does not require, for example, a complicated operation such as an operation of presetting recognition information. Also, in the display system 1c according to the present embodiment, the portable device 200 can easily associate the recognition information with a position of each of the plurality of display devices 100 by causing the output information representing the recognition information generated by each of the plurality of display devices 100 to be output from the display unit 110. Consequently, the display system 1c according to the present embodiment can improve the convenience.

The present invention is not limited to the above-described embodiment and can be changed without departing from the spirit of the present invention.

For example, although the portable device 20 (20a, 200) has been described as electronic device such as a smartphone or a tablet terminal in each of the above-described embodiments, the present invention is not limited thereto and, for example, dedicated remote control device, may be used.

Also, although an example in which the coordinates on the captured image are used as "detected coordinates" stored in the recognition number list storage unit 232 has been described in each of the above-described embodiments, the detected coordinates may be coordinates on the touch screen 24 identifying a position of each of the plurality of display devices 10 or coordinates of a display area of a selection button and a selection area identifying each display device 10.

Also, in the first and third embodiments described above, the display device 10 (10b) is not limited to the liquid crystal display including the backlight 111, and may be, for example, a display using an organic EL, which is a self-luminous device, or a light emitting diode (LED), instead of the backlight 111, the liquid crystal panel 112, and the color filter 113.

Also, the configuration provided in the above-described display system 1 (1a to 1c) internally includes a computer system. Processes in the components provided in the above-described display system 1 (1a to 1c) may be performed by recoding a program for implementing functions of the components provided in the above-described display system 1 (1a to 1c) on a computer-readable recording medium and causing the computer system to read and execute the program recorded on the recording medium. Here, "causing the computer system to read and execute the program recorded on the recording medium" includes installing the program in the computer system. The "computer system" described here is assumed to include an operating system (OS) and hardware such as peripheral devices.

Also, the "computer system" may include a plurality of computer devices connected via the Internet, a wide area network (WAN), a local area network (LAN), or a network including a communication circuit such as a dedicated circuit. Also, the "computer-readable recording medium" refers to a storage device including a flexible disk, a magneto-optical disc, a read only memory (ROM), a portable medium such as a compact disc (CD)-ROM, or a hard disk embedded in the computer system. As described above, the recording medium storing the program may be a non-transitory recording medium such as a CD-ROM.

The recording medium also includes a recording medium provided internally or externally so that the recording medium can be accessed from a distribution server for distributing the program. Also, a configuration in which a program is divided into a plurality of program parts, the program parts are downloaded at different timings, and the downloaded program parts are combined in the configuration provided in the display system 1 (1a to 1c) or a distribution server for distributing parts of the divided program may be different. Further, the "computer-readable recording medium" may include a computer-readable recording medium for retaining the program for a certain time period as in a volatile memory (a RAM) inside the computer system including a server and a client when the program is transmitted via a network. The above-described program may be used to implement some of the above-described functions. Further, the above-described program may be a program capable of implementing the above-described function in combination with a program already recorded on the computer system, i.e., a so-called differential file (differential program).

Also, some of all of the above-described functions may be implemented as an integrated circuit such as a large scale integration (LSI) circuit. The above-described functions may be made into a processor individually or some or all thereof may be integrated into a processor. Also, a technique of forming an integrated circuit is not limited to an LSI circuit and this may be implemented by a dedicated circuit and/or a general-purpose processor. Also, if technology for an integrated circuit which replaces an LSI circuit emerges with the advancement of semiconductor technology, an integrated circuit based on this technology may be used.

REFERENCE SIGNS LIST 1, 1a, 1b, 1c Display system
10, 10-1, 10-2, 10-3, 10-4, 10-5, 10-6, 10a, 10b, 100, 100-1, 100-2 Display device
11, 11-1, 11-2, 11-3, 11-3, 11-4, 11-5, 11-6, 11a, 11b, 110 Display unit
12 Recognition number generation unit
13, 13a, 130 Display control unit
14, 14-1, 14-2, 14-3, 14-4, 14-5, 14-6 Remote control signal reception unit
15 Recognition number storage unit
16 Display pattern generation unit
17 Video processing unit 18 Display switching unit
19 Modulated signal generation unit
20, 20a, 200 Portable device
21, 210 Imaging unit
22, 22a, 220 Device control unit
23 Device storage unit
24 Touch screen
25 Remote control signal transmission unit
30 Display panel
30a Projection unit
111 Backlight
111a Light source unit
112 Liquid crystal panel
112a Spatial light modulation unit
113 Color filter
113a Projection lens unit
114 Liquid crystal panel drive unit
114a Spatial light modulator drive unit
115 Backlight modulation unit
120 Identification information generation unit
221 Recognition number generation instruction unit
222, 222a Recognition number detection unit
223 Button control unit
224 Operation command processing unit
231 Dedicated program storage unit
232 Recognition number list storage unit
241 Portable device display unit
242 Touch coordinate detection unit
SC Screen

What is claimed is:

1. A display system comprising:
a plurality of display devices; and
a portable device configured to operate the plurality of display devices,
wherein each of the plurality of display devices includes:
an identification information generation unit configured to generate a respective identification information for identifying its own device; and
a display control unit configured to cause output information representing the respective identification information, generated by the identification information generation unit, of each of the plurality of devices, to be output from a display unit, and
wherein the portable device includes:
an imaging unit configured to capture an image displayed by the display unit of each of the plurality of display devices, wherein the image includes output information representing the respective identification information generated by the identification information generation unit of each of the plurality of display devices; and
a device control unit configured to detect the respective identification information identifying each of the plurality of display devices on a basis of the output information representing the respective identification information included in the image captured by the imaging unit and associate the detected respective identification information with a respective position of each of the plurality of display devices.

2. The display system according to claim 1,
wherein the portable device includes:
a touch screen having an operation display unit configured to display an operation screen for operating the plurality of display devices; and
an operation detection unit configured to detect an operation of a user,
wherein the device control unit is configured to cause the operation display unit to display a selection area where each of the plurality of display devices is selected so that the selection area is displayed in accordance with an arrangement of the plurality of display devices on a basis of the respective identification information and the position of each of the plurality of display devices that have been associated, and
wherein the device control unit executes an operation of selecting the display device identified by the selection area according to the respective identification information when the operation detection unit has detected the operation of selecting the selection area.

3. The display system according to claim 1, wherein the device control unit transmits a regeneration instruction for instructing the display device identified by the identification information, which is duplicate, to regenerate identification information when the detected respective identification information is duplicate,
wherein the identification information generation unit regenerates the identification information when the regeneration instruction for its own device has been received, and
wherein the display control unit causes output information representing the regenerated identification information to be output from the display unit.

4. The display system according to claim 3, wherein the device control unit transmits generation exclusion information representing a list of the respective identification information identifying the display devices whose identification information is not duplicate among the plurality of display devices when the regeneration instruction is transmitted to the display device identified by the respective identification information that is duplicate, and
wherein the identification information generation unit regenerates the respective identification information other than the respective identification information included in the generation exclusion information when the regeneration instruction for its own device has been received.

5. The display system according to claim 1, wherein each of the plurality of display devices includes a pattern generation unit configured to generate a display pattern representing the respective identification information as the output information,
wherein the display control unit causes the display unit to display the display pattern generated by the pattern generation unit, and
wherein the device control unit detects the respective identification information identifying each of the plurality of display devices on a basis of the display pattern included in the image captured by the imaging unit.

6. The display system according to claim 1, wherein each of the plurality of display devices includes a modulated signal generation unit configured to generate a modulated signal representing the respective identification information as the output information,
wherein the display control unit modulates luminance of the display unit on a basis of the modulated signal generated by the modulated signal generation unit and causes the modulated luminance to be output, and
wherein the device control unit detects the respective identification information identifying each of the plurality of display devices on a basis of the modulated luminance of the display unit included in the image captured by the imaging unit.

7. The display system according to claim 1, wherein the display unit includes a display panel configured to display the image.

8. The display system according to claim 1, wherein the display unit includes a projection unit configured to project the image onto a display target.

9. The display system according to claim 1, wherein the portable device includes a transmission unit configured to transmit operation information representing content of the operation to all of the plurality of display devices or each of the plurality of display devices, and
wherein each of the plurality of display devices includes a reception unit configured to receive the operation information transmitted by the portable device.

10. The display system according to claim 1, wherein the portable device includes a transmission unit configured to transmit operation information including an operation command for:
collectively operating all of the display devices; and
operating a specific display device of the plurality of display devices including the respective identification information of the specific display device service as an operation target.

11. A method of controlling a display system including a plurality of display devices and a portable device configured to operate the plurality of display devices, the method comprising:
generating a respective identification information in which each of the plurality of display devices generates identification information for identifying its own device;
performing a first display control in which each of the plurality of display devices cause output information representing the respective identification information, generated by the identification information generation unit, of each of the plurality of display devices, to be output from a display unit;
performing an imaging process in which the portable device captures an image displayed by the display unit of each of the plurality of display devices wherein the image includes output information representing the respective identification information generated by the identification information generation unit of each of the plurality of display devices; and
performing a second device control in which the portable device detects the respective identification information identifying each of the plurality of display devices on a basis of the output information representing the respective identification information included in the image captured in the imaging step and associates the detected respective identification information with a respective position of each of the plurality of display devices.

12. The display system according to claim 1, wherein the identification information generation unit generates the respective identification information for identifying its own device independently of another of the plurality of devices.

13. The display system according to claim 1, wherein the output information as a basis for detecting the respective identification information is identified based on a recognition number pattern include in the image captured by the imaging unit.

14. The display system according to claim 13, wherein the respective identification information is set differently in each of the plurality of display devices only by directing the imaging unit of the portable device such that the recognition number pattern displayed on each of the plurality of display devices are imaged.

15. The display system according to claim 1, wherein the device control unit includes:
a recognition number detection unit that associates the detected respective identification information with the position of each of the plurality of display devices; and
a recognition number list storage unit to store an association result of the recognition number detection unit as a recognition number list.

16. The display system according to claim 15, wherein the device control unit causes an arrangement of the plurality of display devices to match an arrangement of selection buttons on a touch screen on a basis of the association result stored in the recognition number list storage unit and causes the portable device to display the selection buttons.

17. The display system according to claim 15, wherein the device control unit transmits generation exclusion information representing a list of the respective identification information identifying the display devices whose identification information is not duplicate among the plurality of display devices on a basis of the recognition number list stored in the recognition number list storage unit.

18. The display system according to claim 15, wherein the recognition number detection unit causes the recognition number list storage unit to store selection states identifying all the respective identification information as a non-selected state.

19. The display system according to claim 1, wherein the portable device includes a transmission unit configured to transmit operation information including an operation command for collectively operating all of the display devices.

20. The display system according to claim 1, wherein the portable device includes a transmission unit configured to transmit operation information including an operation command for operating a specific display device of the plurality of display devices including the respective identification information of the specific display device service as an operation target.

* * * * *